US011225234B2

(12) United States Patent
Ueno et al.

(10) Patent No.: US 11,225,234 B2

(45) Date of Patent: Jan. 18, 2022

(54) VEHICLE BRAKING FORCE CONTROL APPARATUS

(71) Applicant: Toyota Jidosha Kabushiki Kaisha, Toyota (JP)

(72) Inventors: Hiroshi Ueno, Toyota (JP); Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 16/550,714

(22) Filed: Aug. 26, 2019

(65) Prior Publication Data

US 2020/0156607 A1 May 21, 2020

(30) Foreign Application Priority Data

Nov. 19, 2018 (JP) ............................ JP2018-216310

(51) Int. Cl.

*B60T 7/12* (2006.01)
*B60B 39/00* (2006.01)

(Continued)

(52) U.S. Cl.

CPC ........... *B60T 8/1761* (2013.01); *B60W 10/20* (2013.01); *B60W 40/068* (2013.01); *B60W 40/107* (2013.01); *B60W 40/12* (2013.01)

(58) Field of Classification Search

CPC ............. B60T 8/1761; B60T 2270/208; B60T 8/17616; B60T 8/175; B60T 8/1755; B60W 40/12; B60W 40/107; B60W 10/20; B60W 40/068; B60W 30/02; B60W 2520/20; B60W 2520/14; B60W 2520/26; B60W 2710/0627; B60W 2710/182; B60W 10/04; B60W 10/18; B60W 10/184;

(Continued)

(56) References Cited

U.S. PATENT DOCUMENTS 4,873,639 A * 10/1989 Sato ....................... B60K 28/16 701/90
4,936,404 A * 6/1990 Matsumoto ............. B60T 8/175 180/197

(Continued)

FOREIGN PATENT DOCUMENTS

JP 2006-315491 A 11/2006
JP 2008037179 * 2/2008 ........... B60T 8/1755

(Continued)

*Primary Examiner* — B M M Hannan

(74) *Attorney, Agent, or Firm* — Dinsmore & Shohl LLP

(57) ABSTRACT

A vehicle braking force control apparatus of the disclosure executes a slip rate reduction control to reduce a slip rate of any of wheels of a vehicle becoming equal to or greater than a predetermined slip rate threshold by automatically changing braking force applied to one or more of the wheels. The apparatus uses a first slip rate threshold as the predetermined slip rate threshold during a normal acceleration-and-deceleration control and a normal steering control. The apparatus uses a second slip rate threshold during a driving assist control. The second slip rate is set to a value smaller than the first slip rate threshold and near and smaller than the slip rate, at which a friction coefficient between the wheel and a surface of a road on which the vehicle moves is maximum.

9 Claims, 19 Drawing Sheets

(51) Int. Cl.

| | |
|---|---|
| ***B60T 8/1761*** | (2006.01) |
| ***B60W 40/12*** | (2012.01) |
| ***B60W 40/107*** | (2012.01) |
| ***B60W 10/20*** | (2006.01) |
| ***B60W 40/068*** | (2012.01) |

(58) Field of Classification Search
CPC ......... B60W 30/165; B60W 30/18163; B60W 30/182; B60W 30/18172
USPC ............................................... 701/71, 79, 83
See application file for complete search history.

(56) References Cited

U.S. PATENT DOCUMENTS

| | | | | |
|---|---|---|---|---|
| 5,570,935 | A * | 11/1996 | Monzaki | B60T 8/17616 303/155 |
| 5,737,714 | A * | 4/1998 | Matsuno | B60K 17/3462 701/89 |
| 2004/0124701 | A1* | 7/2004 | Nihei | B60T 8/1764 303/163 |
| 2005/0103549 | A1* | 5/2005 | Matsuda | B60L 50/10 180/243 |
| 2005/0270145 | A1 | 12/2005 | Kataoka et al. | |
| 2006/0025918 | A1 | 2/2006 | Saeki | |
| 2010/0114449 | A1* | 5/2010 | Shiozawa | B60T 8/172 701/90 |
| 2011/0264349 | A1* | 10/2011 | Okubo | B60T 8/17616 701/71 |
| 2012/0323459 | A1* | 12/2012 | Okubo | B60T 8/172 701/74 |
| 2013/0226429 | A1* | 8/2013 | Udaka | B60T 8/1764 701/73 |
| 2016/0082972 | A1* | 3/2016 | Fairgrieve | B60W 10/184 701/84 |

FOREIGN PATENT DOCUMENTS

| | | | |
|---|---|---|---|
| JP | 2008-195402 | A | 8/2008 |
| JP | 4172434 | B2 | 10/2008 |
| JP | 2009-190464 | A | 8/2009 |
| JP | 4349210 | B2 | 10/2009 |
| JP | 2010-006279 | A | 1/2010 |
| JP | 4929777 | B2 | 5/2012 |
| JP | 2014-148293 | A | 8/2014 |
| JP | 2016-124310 | A | 7/2016 |
| WO | 2011/108082 | A1 | 9/2011 |

* cited by examiner

VEHICLE BRAKING FORCE CONTROL APPARATUS

CROSS-REFERENCE TO RELATED APPLICATION

This application claims priority to Japanese Patent Application No. 2018-216310 filed on Nov. 19, 2018, incorporated herein by reference in its entirety.

BACKGROUND

Field

The disclosure relates to a vehicle braking force control apparatus.

Description of the Related Art

There is known a vehicle braking force control apparatus configured to execute an anti-lock control when (i) a vehicle is being braked, and (ii) a slip rate of any of wheels of the vehicle reaches a predetermined slip rate threshold (for example, see WO2011/108082). The anti-lock control is a control to decrease braking force applied to the wheel having the slip rate reaching the predetermined slip rate threshold to reduce the slip rate to below the predetermined slip rate threshold. Hereinafter, the wheel having the slip rate reaching the predetermined slip rate threshold will be referred to as "the target vehicle wheel", and the wheel of the vehicle will be referred to as "the vehicle wheel".

A road friction coefficient between a road surface and each vehicle wheel becomes a maximum value when (i) the vehicle is being braked, and (ii) the slip rate of the vehicle wheel becomes a certain slip rate. Therefore, in some embodiments, the slip rate is maintained at a slip rate at which the road friction coefficient becomes the maximum value in order to minimize a vehicle braking distance when the vehicle is being braked. Hereinafter, the slip rate at which the road friction coefficient becomes the maximum value will be referred to as "the peak slip rate".

The braking force applied to the target vehicle wheel is decreased when the anti-lock control is executed. Thereby, the slip rate of the target vehicle wheel is reduced. An execution of the anti-lock control is stopped, and the braking force applied to the target vehicle wheel is increased when the slip rate of the target vehicle wheel is reduced to below the predetermined slip rate threshold. Thereby, the slip rate of the target vehicle wheel increases.

Therefore, in some embodiments, the predetermined slip rate threshold used for determining whether to execute the anti-lock control is set to a value that an average of the slip rates of the target vehicle wheel corresponds to the peak slip rate in order to minimize the vehicle braking distance when the anti-lock control is executed while the vehicle is being braked. The slip rate of the target vehicle wheel starts to be reduced slightly after the execution of the anti-lock control starts. Therefore, if the, predetermined slip rate threshold is set to a value slightly smaller than the peak slip rate, the average of the slip rates of the target vehicle wheel may be maintained at or near the peak slip rate.

In this regard, the braking force changes when the anti-lock control is executed. When the slip rate reaches the value slightly smaller than the peak slip rate and then, the anti-lock control is executed, the braking force changes differently from a change of the braking force that a driver of the vehicle expects, based on a driver's operation to a brake pedal. As a result, the driver is likely to feel uneasy.

In general, a problem described above also may arise when (i) a slip rate reduction control is executed, and (ii) a threshold used for determining whether to start or stop an execution of the slip rate reduction control is set to the value slightly smaller than the peak slip rate. The slip rate reduction control is a control to reduce the slip rate reaching a certain slip rate threshold by changing the braking force during an execution of any of (i) a process to brake the vehicle, (ii) a process to accelerate the vehicle, and (iii) a process to turn the vehicle.

SUMMARY

The embodiments herein have been made for solving the problem described above. An object of the present disclosure is to provide a vehicle braking force control apparatus which can execute the slip rate reduction control with preventing the driver from feeling uneasy and controlling the average of the slip rates of the target vehicle wheel to near the peak slip rate.

A vehicle braking force control apparatus according to the disclosure comprises a brake apparatus and an electronic control unit.

The brake apparatus applies braking force to wheels of a vehicle.

The electronic control unit is configured to execute a normal acceleration-and-deceleration control to (i) accelerate the vehicle at a requested acceleration set, based on an acceleration request operation performed by a driver of the vehicle, and (ii) decelerate the vehicle at a requested deceleration set, based on a deceleration request operation performed by the driver.

The electronic control unit is further configured to execute a normal steering control to steer the vehicle by a requested steering amount set, based on a steering request operation performed by the driver.

The electronic control unit is further configured to execute a driving assist control including at least one of (i) an acceleration-and-deceleration assist control and (ii) a steering assist control. The acceleration-and-deceleration assist control is a control to automatically accelerate the vehicle at a target acceleration which the electronic control unit sets, independently of the acceleration request operation and automatically decelerate the vehicle at a target deceleration which the electronic control unit sets, independently of the deceleration request operation. The steering assist control is a control to automatically steer the vehicle by a target steering amount which the electronic control unit sets, independently of the steering request operation.

The electronic control unit is further configured to execute a slip rate reduction control to reduce a slip rate of the wheel of the vehicle becoming equal to or greater than a predetermined slip rate threshold by automatically changing the braking force applied from the brake apparatus to one or more of the wheels of the vehicle.

The electronic control is further configured to use a first slip rate threshold as the predetermined slip rate threshold when the electronic control unit executes the normal acceleration-and-deceleration control and the normal steering control.

The electronic control unit is further configured to use a second slip rate threshold when the electronic control unit executes the driving assist control. The second slip rate is set to a value smaller than the first slip rate threshold and near and smaller than a peak slip rate corresponding to the slip rate, at which a friction coefficient between the wheel of the vehicle and a surface of a road on which the vehicle moves is maximum.

With the vehicle braking force control apparatus according to the disclosure, the relatively large first slip rate threshold is used as the predetermined slip rate threshold for determining whether to execute the slip rate reduction control when the normal acceleration-and-deceleration control and the normal steering control are executed. In this case, the braking force is generally changed by the slip rate reduction control as the driver expects from the driver's deceleration request operation, the driver's acceleration request operation, and the driver's steering request operation. As a result, the driver can be prevented from feeling uneasy as to automatically changing the braking force by the slip rate reduction control.

On the other hand, the second slip rate threshold is used as the predetermined slip rate threshold when the driving assist control is executed. The second slip rate threshold is set to the value smaller than the first slip rate threshold and near and smaller than the peak slip rate. In this case, the slip rate becoming equal to or greater than the second slip rate threshold may start to be reduced by the slip rate reduction control after the slip rate in question slightly exceeds the peak slip rate. Thus, the slip rate once becoming equal to or greater than the second slip rate threshold is likely to be controlled to near the peak slip rate by the slip rate reduction control while the driving assist control is executed.

In addition, the driver does not need to perform the deceleration request operation, the acceleration request operation, and the steering request operation when the driving assist control is executed. Thus, the driver is unlikely to feel uneasy even if the braking force is automatically changed by the slip rate reduction control before the slip rate exceeds the peak slip rate.

Therefore, with the vehicle braking force control apparatus according to the disclosure, the slip rate once becoming equal to or greater than the second slip rate threshold is likely to be controlled to near the peak slip rate by the slip rate reduction control with preventing the driver from feeling uneasy as to automatically changing the braking force by the slip rate reduction control when the driving assist control is executed.

According to an aspect f the disclosure, the first slip rate threshold may be greater than the peak slip rate.

According to another aspect of the disclosure, the electronic control unit may be configured to execute the slip rate reduction control when (i) the electronic control unit executes the driving assist control, (ii) the slip rate of the wheel of the vehicle becomes equal to or greater than the second slip rate threshold, and (iii) an increase rate of the slip rate becoming equal to or greater than the second slip rate threshold is equal to or greater than a predetermined increase rate threshold.

An execution of the slip rate reduction control is started when the slip rate of the wheel of the vehicle becomes equal to or greater than the second slip rate threshold during an execution of the driving assist control. At this moment, the increase rate of the slip rate in question may be small. If the increase rate of the slip rate becoming equal to or greater than the second slip rate threshold is small after the execution of the slip rate reduction control is started, the slip rate in question may start to be reduced before the slip rate in question exceeds the peak slip rate. In this case, the slip rate once becoming equal to or greater than the second slip rate threshold may not be controlled to near the peak slip rate.

With this aspect of the disclosure, a condition for executing the slip rate reduction control during the execution of the driving assist control includes a condition that the increase rate of the slip rate becoming equal to or greater than the second slip rate threshold is equal to or greater than the predetermined increase rate threshold. Therefore, the slip rate once becoming equal to or greater than the second slip rate threshold can be surely controlled to near the peak slip rate by the slip rate reduction control when the driving assist control is executed.

According to further another aspect of the disclosure, the acceleration-and-deceleration assist control may be any of (i) an inter-vehicle distance control and (ii) a constant vehicle movement speed control. The inter-vehicle distance control is a control to control a distance between the vehicle as an own vehicle and another vehicle moving ahead of the own vehicle to a predetermined distance by automatically accelerating or decelerating the own vehicle. The constant vehicle movement speed control is a control to control a movement speed of the own vehicle to a predetermined movement speed by automatically accelerating or decelerating the own vehicle.

In this case, the slip rate reduction control is any of (i) an anti-lock control and (ii) a traction control. The anti-lock control is a control to reduce the slip rate becoming equal to or greater than the predetermined slip rate threshold by automatically decreasing the braking force applied to the wheel of the own vehicle having the slip rate becoming equal to or greater than the predetermined slip rate threshold during an execution of a process to apply the braking force to the wheels of the vehicle from the brake apparatus. The traction control is a control to reduce the slip rate becoming equal to or greater than the predetermined slip rate threshold by automatically increasing the braking force applied to the wheel of the own vehicle having the slip rate becoming equal to or greater than the predetermined slip rate threshold during an execution of a process to accelerate the own vehicle.

With this aspect of the disclosure, an execution of the anti-lock control as the slip rate reduction control is started when (i) the own vehicle is automatically braked by the inter-vehicle distance control or the constant vehicle movement speed control, and (ii) the slip rate of any of the wheels of the own vehicle becomes equal to or greater than the second slip rate threshold. The second slip rate threshold is set to the value near and smaller than the peak slip rate. Thus, the slip rate once becoming equal to or greater than the second slip rate threshold is likely to be controlled to near the peak slip rate by the anti-lock control during an execution of the inter-vehicle distance control or the constant vehicle movement speed control. In addition, the driver of the own vehicle does not need to perform the deceleration request operation when the inter-vehicle distance control or the constant vehicle movement speed control is executed. In this case, the driver is unlikely to feel uneasy even if the braking force is automatically decreased by the anti-lock control before the slip rate of any of the wheels of the own vehicle exceeds the peak slip rate.

Further, with this aspect of the disclosure, an execution of the traction control as the slip rate reduction control is started when (i) the own vehicle is automatically accelerated by the inter-vehicle distance control or the constant vehicle movement speed control, and (ii) the slip rate of any of the wheels of the own vehicle becomes equal to or greater than the second slip rate threshold. The second slip rate threshold is set to the value near and smaller than the peak slip rate. Thus, the slip rate once becoming equal to or greater than the second slip rate threshold is likely to be controlled to near the peak slip rate by the traction control during the execution of the inter-vehicle distance control or the constant vehicle movement speed control. In addition, the driver of the own vehicle does not need to perform the acceleration request operation when the inter-vehicle distance control or the constant vehicle movement speed control is executed. Thus, the driver is unlikely to feel uneasy even if the braking force is automatically increased by the traction control before the slip rate of any of the wheels of the own vehicle exceeds the peak slip rate.

According to further another aspect of the disclosure, the steering assist control may be a lane keep control to cause the vehicle to move along a target movement line by automatically steering the vehicle. In this case, the slip rate reduction control may be a vehicle behavior control to reduce the slip rate becoming equal to or greater than the predetermined slip rate threshold by automatically increasing the braking force applied to at least one of the wheels of the vehicle during an execution of a process to steer the vehicle.

With this aspect of the disclosure, an execution of the vehicle behavior control as the slip rate reduction control is started when (i) the vehicle is automatically turned by the lane keep control, and (ii) the slip rate of any of the wheels of the vehicle becomes equal to or greater than the second slip rate threshold. The second slip rate threshold is set to the value near and smaller than the peak slip rate. Thus, the slip rate once becoming equal to or greater than the second slip rate threshold is likely to be controlled to near the peak slip rate by the vehicle behavior control during an execution of the lane keep control. In addition, the driver does not need to perform the steering request operation when the lane keep control is executed. Thus, the driver is unlikely to feel uneasy even if the braking force is automatically increased by the vehicle behavior control, i.e., a turn behavior of the vehicle is automatically changed by the vehicle behavior control before the slip rate of any of the wheels of the vehicle exceeds the peak slip rate.

According to further another aspect of the disclosure, the driving assist control may include a preceding vehicle following control to cause the vehicle as an own vehicle to move to follow another vehicle moving ahead of the own vehicle by automatically accelerating or decelerating the own vehicle and steering the own vehicle as the acceleration-and-deceleration assist control and the steering assist control.

In this case, the slip rate reduction control is any of (i) the anti-lock control, (ii) the traction control, and (iii) the vehicle behavior control.

With this aspect of the disclosure, the execution of the anti-lock control as the slip rate reduction control is started when (i) the own vehicle is automatically braked by the preceding vehicle following control, and (ii) the slip rate of any of the wheels of the own vehicle becomes equal to or greater than the second slip rate threshold. The second slip rate threshold is set to the value near and smaller than the peak slip rate. Thus, the slip rate once becoming equal to or greater than the second slip rate threshold is likely to be controlled to near the peak slip rate by the anti-lock control during an execution of the preceding vehicle following control. In addition, the driver of the own vehicle does not need to perform the deceleration request operation when the preceding vehicle following control is executed. Thus, the driver is unlikely to feel uneasy even if the braking force is automatically decreased by the anti-lock control before the slip rate of any of the wheels of the own vehicle exceeds the peak slip rate.

Further, with this aspect of the disclosure, the execution of the traction control as the slip rate reduction control is started when (i) the own vehicle is automatically accelerated by the preceding vehicle following control, and (ii) the slip rate of any of the wheels of the own vehicle becomes equal to or greater than the second slip rate threshold. The second slip rate threshold is set to the value near and smaller than the peak slip rate. Thus, the slip rate once becoming equal to or greater than the second slip rate threshold is likely to be controlled to near the peak slip rate by the traction control during the execution of the preceding vehicle following control. In addition, the driver of the own vehicle does not need to perform the acceleration request operation when the preceding vehicle following control is executed. Thus, the driver is unlikely to feel uneasy even if the braking force is automatically increased by the traction control before the slip rate of any of the wheels of the own vehicle exceeds the peak slip rate.

Further, with this aspect of the disclosure, the execution of the vehicle behavior control as the slip rate reduction control is started when (i) the own vehicle is automatically turned by the preceding vehicle following control, and (ii) the slip rate of any of the wheels of the own vehicle becomes equal to or greater than the second slip rate threshold. The second slip rate threshold is set to the value near and smaller than the peak slip rate. Thus, the slip rate once becoming equal to or greater than the second slip rate threshold is likely to be controlled to near the peak slip rate by the vehicle behavior control during the execution of the preceding vehicle following control. In addition, the driver of the own vehicle does not need to perform the steering request operation when the preceding vehicle following control is executed. Thus, the driver is unlikely to feel uneasy even if the braking force is automatically increased by the vehicle behavior control, i.e., the turn behavior of the vehicle is automatically changed by the vehicle behavior control before the slip rate of any of the wheels of the own vehicle exceeds the peak slip rate.

According to further another aspect of the disclosure, the traction control may be a control to reduce the slip rate becoming equal to or greater than the predetermined slip rate threshold by automatically decreasing a driving force applied to the own vehicle for driving the own vehicle in addition to automatically increasing the braking force applied to the wheel of the own vehicle having the slip rate becoming equal to or greater than the predetermined slip rate threshold.

Further, according to this aspect of the disclosure, the vehicle behavior control may be a control to reduce the slip rate becoming equal to or greater than the predetermined slip rate threshold by automatically decreasing a driving force applied to the own vehicle for driving the own vehicle in addition to automatically increasing the braking force applied to at least one of the wheels of the own vehicle.

The elements of the present disclosure are not limited to the elements of the embodiment defined by the reference symbols. The other objects, features and accompanied advantages of the present disclosure can be easily understood from the description of the embodiment of the present disclosure along with the drawings.

DETAILED DESCRIPTION

Figure 1:
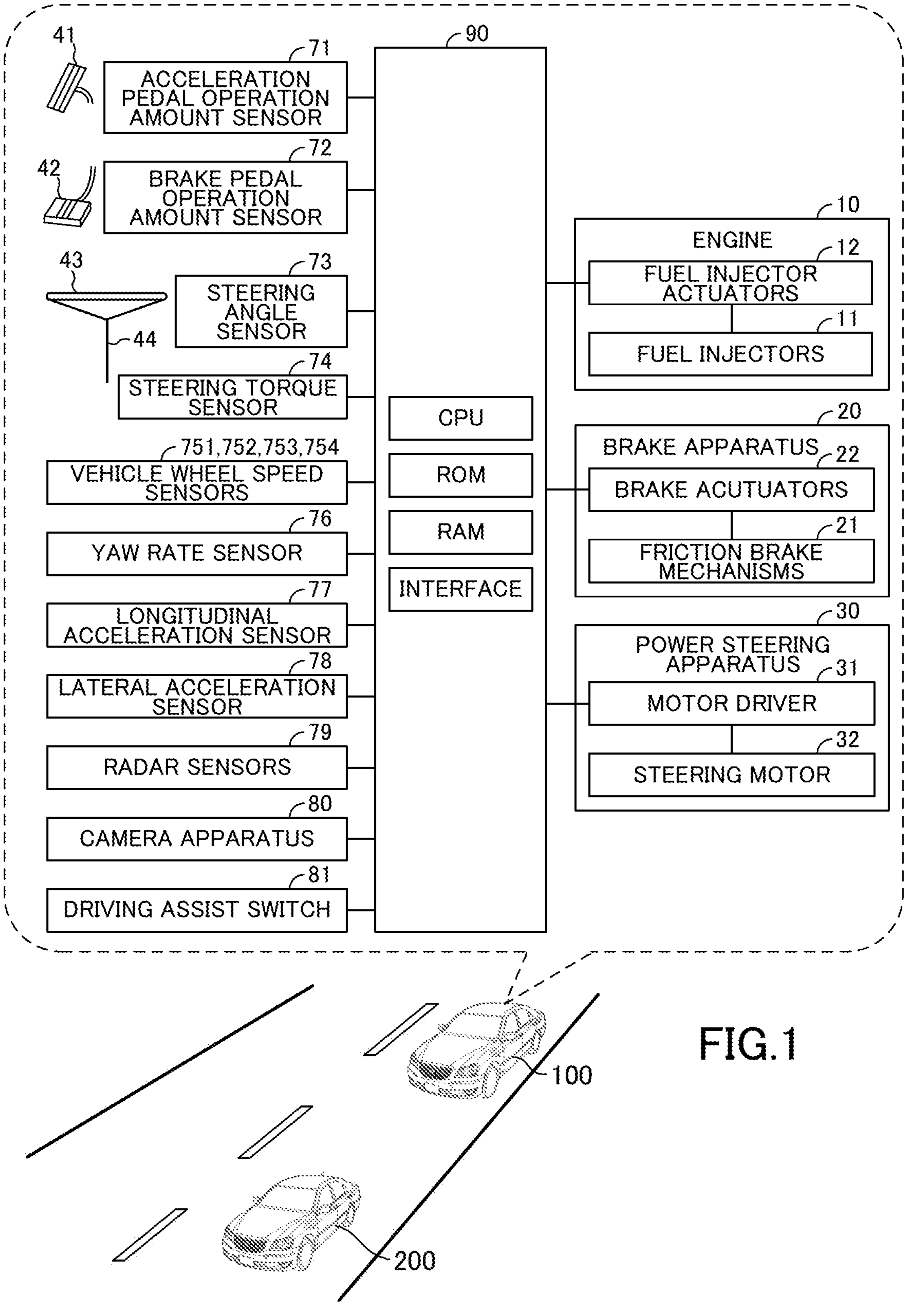
FIG. 1 is a view for showing a vehicle braking force control apparatus according to an embodiment of the disclosure and a vehicle, to which the vehicle braking force control apparatus is applied.

Below, a vehicle control apparatus including a vehicle braking force control apparatus according to an embodiment of the disclosure will be described with reference to the drawings. Hereinafter, the vehicle control apparatus including the vehicle braking force control apparatus according to the embodiment will be referred to as "the embodiment control apparatus". The embodiment control apparatus is applied to a vehicle 100 shown in FIG. 1. As shown in FIG. 2, the vehicle 100 has a left front vehicle wheel 51, a right front vehicle wheel 52, a left rear vehicle wheel 53, and a right rear vehicle wheel 54.

In this description, the term "vehicle wheel 50" represents each of the vehicle wheels 51 to 54. The left front vehicle wheel 51 will be referred to as "the left front wheel 51", the right front vehicle wheel 52 will be referred to as "the right front wheel 52", the left rear vehicle wheel 53 will be referred to as "the left rear wheel 53", and the right rear vehicle wheel 54 will be referred to as "the right rear wheel 54".

Figure 2:
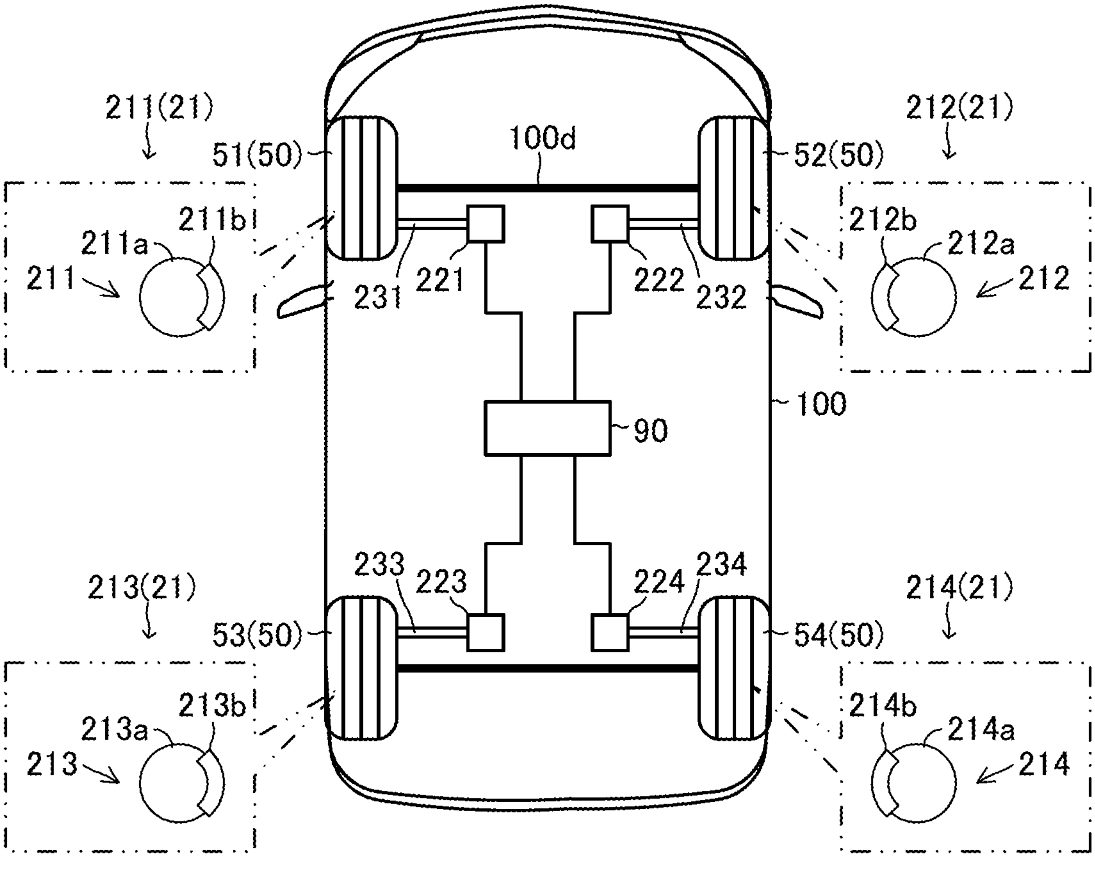
FIG. 2 is a view for showing the vehicle, to which the vehicle braking force control apparatus is applied.

As shown in FIG. 1, the embodiment control apparatus includes an ECU 90. The term "ECU" stands for electronic control unit. The ECU 90 includes a micro-computer as a main component. The micro-computer includes a CPU, a ROM, a RAM, a non-volatile memory, an interface, etc. The CPU is configured or programmed to execute instructions, programs, and routines stored in the ROM to realize various functions.

As shown, in FIG. 1, the vehicle 100 has an internal combustion engine 10, a brake apparatus 20, and a power steering apparatus 30.

<Internal Combustion Engine>

The engine 10 is a known compression-ignition-type multi-cylinder internal combustion engine or a so-called diesel engine. In this regard, the engine 10 may be a known spark-ignition-type multi-cylinder internal combustion engine or a so-called gasoline engine.

The engine 10 includes combustion chambers (not shown), fuel injectors 11 for injecting fuel into the combustion chambers, respectively, fuel injector actuators 12 for controlling activations of the fuel injectors 11, respectively, etc.

The fuel injector actuators 12 are electrically connected to the ECU 90. The ECU 90 controls amounts of the fuel injected from the fuel injectors 11 to control a torque generated by the engine 10 by controlling activations of the fuel injector actuators 12. Hereinafter, the amount of the fuel injected from each fuel injector 11 will be referred to as "the fuel injection amount", and the torque generated by the engine 10 will be referred to as "the engine torque". The engine torque increases as the fuel injection amount increases. The engine torque is transmitted to the left and right front wheels 51 and 52 through a transmission (not show) and a drive shaft 100*d* (see FIG. 2).

<Brake Apparatus>

The brake apparatus 20 is a known apparatus. As shown in FIG. 2, the brake apparatus 20 includes friction brake mechanisms 211 to 214, brake actuators 221 to 224, hydraulic oil passages 231 to 234, etc. The friction brake mechanisms 211 to 214 are provided corresponding to the vehicle wheels 51 to 54, respectively. The brake actuators 221 to 224 are provided corresponding to the friction brake mechanisms, respectively. The hydraulic oil passages 231 to 234 are provided corresponding to the brake actuators 221 to 224, respectively.

In this description, the term "friction brake mechanism 21" represents each of the friction brake mechanisms 211 to 214, and the, term "brake actuator 22" represents each of the brake actuators 221 to 224.

The friction brake mechanisms 211 to 214 include brake discs 211*a* to 214*a* and brake calipers 211*b* to 214*b*, respectively. The brake discs 211*a* to 214*a* are secured to the respective vehicle wheels 51 to 54. The brake calipers 211*b* to 214*b* are secured to a body of the vehicle 100.

The friction brake mechanisms 211 to 224 are fluidically connected to the respective brake calipers 211*b* to 214*b* through the respective hydraulic oil passages 231 to 234. The brake actuators 221 to 224 supply hydraulic oil compressed by a master cylinder (not shown) to the respective friction brake mechanisms 211 to 214, in particular, the respective brake calipers 211*b* to 214*b* through the respective hydraulic oil passages 231 to 234.

Brake pads of the brake calipers 211*b* to 214*b* are pressed on the respective brake discs 211*a* to 214*a* when the hydraulic oil is supplied to the friction brake mechanisms 21. Thereby, braking forces are applied to the vehicle wheels 50, respectively.

The brake actuators 22 are electrically connected to the ECU 90. The ECU 90 controls a pressure of the hydraulic oil supplied to the friction brake mechanisms 21 by controlling activations of the brake actuators 22. Hereinafter, the pressure of the hydraulic oil will be referred to as "the brake hydraulic pressure". The braking forces applied to the vehicle wheels 50 increase as the brake hydraulic pressure applied to the friction brake mechanisms 21 increase.

<Power Steering Apparatus>

The power steering apparatus 30 is a known apparatus. As shown in FIG. 1, the power steering apparatus 30 includes a motor driver 31 and a steering motor 32. The motor driver 31 is electrically connected to the steering motor 32. The steering motor 32 generates a torque by electric power supplied from the motor driver 31, thereby applying the torque to a steering shaft 44.

The motor driver 31 is electrically connected to the ECU 90. The ECU 90 controls an activation of the motor driver 31. The ECU 90 controls the torque applied to the steering shaft 44 from the steering motor 32 by controlling the activation of the motor driver 31.

<Sensors, Etc.>

An acceleration pedal operation amount sensor 71, a brake pedal operation amount sensor 72, a steering angle sensor 73, a steering torque sensor 74, vehicle wheel rotation speed sensors 751 to 754, a yaw rate sensor 76, a longitudinal acceleration sensor 77, a lateral acceleration sensor 78, radar sensors 79, a camera apparatus 80, and a driving assist switch 81 are mounted on the vehicle 100.

The acceleration pedal operation amount sensor 71 is electrically connected to the ECU 90. The acceleration pedal operation amount sensor 71 detects an operation amount of an acceleration pedal 41 and sends a signal representing the detected operation amount to the ECU 90. The ECU 90 acquires the operation amount of the acceleration pedal 41 as an acceleration pedal operation amount AP, based on the signal sent from the acceleration pedal operation amount sensor 71.

The brake pedal operation amount sensor 72 is electrically connected to the ECU 90. The brake pedal operation amount sensor 72 detects an operation amount of a brake pedal 42 and sends a signal representing the detected operation amount to the ECU 90. The ECU 90 acquires the operation amount of the brake pedal 42 as a brake pedal operation amount BP, based on the signal sent from the brake pedal operation amount sensor 72.

The steering angle sensor 73 is electrically connected to the ECU 90. The steering angle sensor 73 detects a steering angle of any of the left and right front wheels 51 and 52 to be steered and sends a signal representing the detected steering angle to the ECU 90. The ECU 90 acquires the steering angle of any of the left and right front wheels 51 and 52 as a steering angle θst, based on the signal sent from the steering angle sensor 73.

The steering torque sensor 74 is electrically connected to the ECU 90. The steering torque sensor 74 detects a torque applied to the steering shaft 44 by a driver of the vehicle 100 operating a steering wheel 43 and sends a signal representing the detected torque to the ECU 90. The ECU 90 acquires the torque applied to the steering shaft 44 as a driver steering torque TQdriver, based on the signal sent from the steering torque sensor 74. In this embodiment, the driver steering torque TQdriver is greater than zero when the driver operates the steering wheel 43 to turn the vehicle 100 leftward. On the other hand, the driver steering torque TOdriver is smaller than zero when the driver operates the steering wheel 43 to turn the vehicle 100 rightward.

The vehicle wheel rotation speed sensors 751 to 754 are electrically connected to the ECU 90. The vehicle wheel rotation speed sensors 751 to 754 detect rotation speeds of the respective vehicle wheels 50 and send signals representing the detected rotation speeds to the ECU 90. The ECU 90 acquires the rotation speeds of the vehicle wheels 50 as vehicle wheel rotation speeds V1 to V4, based on the signals sent from the vehicle wheel rotation speed sensors 751 to 754.

The ECU 90 acquires an average Vave of the acquired vehicle wheel rotation speeds V1 to V4 as a movement speed of the vehicle 100 (Vave=(V1+V2+V3+V4)/4). Hereinafter, the average Vave will be referred to as "the average vehicle wheel rotation speed Vave", and the movement speed of the vehicle 100 will be referred to as "the vehicle movement speed SPD".

The ECU 90 acquires slip rates SD1 to SD4 of the vehicle wheels 50, based on (i) the average vehicle wheel rotation speed Vave and (ii) the vehicle wheel rotation speeds V1 to V4 with using expressions (1) to (4) described below. Hereinafter, the slip rates SD1 to SD4 will be referred to as "the first to fourth deceleration slip rates SD1 to SD4", respectively. In this description, the term "deceleration slip rate SD" represents each of the first to fourth deceleration slip rates SD1 to SD4.

$$SD1=(Vave-V1)/Vave \tag{1}$$

$$SD2=(Vave-V2)/Vave \tag{2}$$

$$SD3=(Vave-V3)/Vave \tag{3}$$

$$SD4=(Vave-V4)/Vave \tag{4}$$

The ECU 90 acquires slip rates SA1 and SA2 of the left and right front wheels 51 and 52 to be driven, based on (i) the average vehicle wheel rotation speed Vave and (ii) the vehicle wheel rotation speeds V1 and V2 with using expressions (5) and (6) described below. Hereinafter, the slip rates SA1 and SA2 will be referred to as "the first and second acceleration slip rates SA1 and SA2", respectively. In this description, the term "acceleration slip rate SA" represents each of the first and second acceleration slip rates SA1 and SA2".

$$SA1=(V1-Vave)/V1 \tag{5}$$

$$SA2=(V2-Vave)/V2 \tag{6}$$

The yaw rate sensor 76 is electrically connected to the ECU 90. The yaw rate sensor 76 detects a yaw rate of the vehicle 100 and sends a signal representing the detected yaw rate to the ECU 90. The ECU 90 acquires the yaw rate of the vehicle 100 as a yaw rate δ, based on the signal sent from the yaw rate sensor 76. In addition, the ECU 90 acquires a difference between the actual yaw rate δ and an expected yaw rate δexp as an expected yaw rate difference Δδexp (=δexp−δ). The expected yaw rate δexp is the yaw rate δ expected to be achieved when the vehicle 100 normally turns, based on a relationship between the vehicle movement speed SPD and the steering angle θst.

The longitudinal acceleration sensor 77 is electrically connected to the ECU 90. The longitudinal acceleration sensor 77 detects an acceleration of the vehicle 100 in a longitudinal direction of the vehicle 100 and sends a signal representing the detected acceleration to the ECU 90. The ECU 90 acquires the acceleration of the vehicle 100 in the longitudinal direction of the vehicle 100 as a longitudinal acceleration Gx, based on the signal sent from the longitudinal acceleration sensor 77.

The lateral acceleration sensor 78 is electrically connected to the ECU 90. The lateral acceleration sensor 78 detects an acceleration of the vehicle 100 in a lateral direction or a width direction of the vehicle 100 and sends a signal representing the detected acceleration to the ECU 90. The ECU 90 acquires the acceleration of the vehicle 100 in the lateral direction of the vehicle 100 as a lateral acceleration Gy, based on the signal sent from the lateral acceleration sensor 78.

Further, the ECU 90 acquires an angle defined by the longitudinal direction of the vehicle 100 or an orientation of the vehicle 100 and a movement direction of the vehicle 100 as a slip angle θslip, based on (i) the longitudinal acceleration Gx, (ii) the lateral acceleration Gy, etc. Furthermore, the ECU 90 acquires a change rate of the slip angle θslip as a slip angle rate ωslip.

The radar sensors 79 are electrically connected to the ECU 90. Each radar sensor 79 emits radio wave of millimeter waveband ahead of the vehicle 100. Hereinafter, the radio wave of the millimeter waveband will be referred to as "the millimeter wave". The radar sensor 79 receives the millimeter wave reflected by a preceding vehicle 200. The preceding vehicle 200 is a vehicle moving ahead of the vehicle 100. Hereinafter, the millimeter wave reflected by the preceding vehicle 200 will be referred to as "the reflected wave". The radar sensor 79 sends to the ECU 90 signals representing a difference in phase between the emitted millimeter wave and the received reflected wave, an attenuation level of the received reflected wave, a time taken for the radar sensor 79 to receive the reflected wave after the radar sensor 79 emits the millimeter wave, etc. The ECU 90 acquires a distance between the preceding vehicle 200 and the vehicle 100 as an inter-vehicle distance ID, based on the signals sent from the radar sensors 79. In addition, the ECU 90 acquires a difference of the inter-vehicle distance D relative to a target inter-vehicle distance Dtgt as an inter-vehicle distance difference ΔD (=Dtgt−D). The target inter-vehicle distance Dtgt is the inter-vehicle distance D to be a target in an inter-vehicle distance control described later.

The camera apparatus 80 is electrically connected to the ECU 90. The camera apparatus 80 includes a camera. The camera apparatus 80 takes an image of a view ahead of the vehicle 100 by the camera and acquires image data of the taken image of the view. The camera apparatus 80 sends the image data to the ECU 90. The ECU 90 realizes or acquires objects such as the preceding vehicle 200 and a walking person, a relationship in position between the vehicle 100 and the objects, left and right white lane markings LL and LR of a vehicle lane in which the vehicle 100 moves, etc., based on the image data sent from the camera apparatus 80.

The driving assist switch 81 is electrically connected to the ECU 90. The driving assist switch 81 is operated by a driver of the vehicle 100. The driver can select a control/controls to be executed from a lane keep control describe later and the inter-vehicle distance control by operating the driving assist switch 81. The ECU 90 determines that an execution of the lane keep control is requested when the lane keep control is selected as the control to be executed by the driver operating the driving assist switch 81. On the other hand, the ECU 90 determines that an execution of the inter-vehicle distance control is requested when the inter-vehicle distance control is selected as the control to be executed by the driver operating the driving assist switch 81. In addition, the ECU 90 determines that the executions of the lane keep control and the inter-vehicle distance control are not requested when the driver sets the driving assist switch 81 at an OFF position.

<Summary of Operation of Embodiment Control Apparatus>

Next, a summary of an operation of the embodiment control apparatus will be described. The embodiment control apparatus is configured to execute various controls described below.

<Lane Keep Control (Driving Assist Control)>

The embodiment control apparatus executes a steering assist control as the lane keep control when the execution of the lane keep control is requested by the driver operating the driving assist switch 81. The steering assist control is one of the driving assist controls. The lane keep control as the steering assist control is a control to automatically apply a steering torque to the steering shaft 44 from the steering motor 32 to maintain a position of the vehicle 100 at around a target movement line in the vehicle lane in which the vehicle 100 moves, independently of driver's operation to the steering wheel 43. Hereinafter, the vehicle lane in which the vehicle 100 moves will be referred to as "the movement lane".

The lane keep control is known in JP 2008-195402 A, JP 2009-190464 A, JP 2010-6279 A, JP 4349210 B, etc. Therefore, the lane keep control will be briefly described below.

The embodiment control apparatus sets a series of center positions between the left and right white lane markings LL and LR as a target movement line Ltgt. The embodiment control apparatus acquires the left and right white lane markings LL and LR, based on the image data sent from the camera apparatus 80. In addition, the embodiment control apparatus calculates or acquires a curvature radius R of the target movement line Ltgt, the position of the vehicle 100 in the movement lane defined by the left and right white lane markings LL and LR, and the orientation of the vehicle 100.

In addition, the embodiment control apparatus calculates (i) a distance Dc in a road width direction between a center position of a front end of the vehicle 100 and the target movement line Ltgt and (ii) a gap angle θy between an extension direction of the target movement line Ltgt and the movement direction of the vehicle 100. Hereinafter, the distance Dc will be referred to as "the center distance Dc", and the gap angle θy will be referred to as "the yaw angle θy".

In addition, the embodiment control apparatus calculates or acquires a target yaw rate δtgt by applying the center distance Dc, the yaw angle θy, and the road curvature v (=1/R) to a following expression (7). In the following expression (7), parameters K1, K2, and K3 are control gains, respectively. The target yaw rate δtgt is a yaw rate of the vehicle 100 set for causing the vehicle 100 to move along the target movement line Ltgt.

$$\delta tgt = K1*Dc + K2*\theta y + K3*v \quad (7)$$

The embodiment control apparatus calculates or acquires a torque TQtgt to be applied to the steering shaft 44 from the steering motor 32 so as to achieve the target yaw rate δtgt, based on a difference Δδtgt between the target yaw rate δtgt and the actual yaw rate δ. Hereinafter, the torque TQtgt will be referred to as "the target steering torque TQtgt". The embodiment control apparatus applies the torque corresponding to the target steering torque TQtgt to the steering shaft 44 from the steering motor 32.

Thereby, the vehicle 100 is caused to move along the target movement line Ltgt.

<Normal Steering Control>

On the other hand, the embodiment control apparatus executes a normal steering control to control an activation of the steering motor 32 so as to apply the torque for assisting the driver's operation to the steering wheel 43 to the steering shaft 44 from the steering motor 32 when the execution of the lane keep control is not requested by the driver operating the driving assist switch 81. The embodiment control apparatus determines the torque to be applied to the steering shaft 44 from the steering motor 32, based on the driver steering torque TQdriver.

<Inter-Vehicle Distance Control (Driving Assist Control)>

The embodiment control apparatus executes an acceleration-and-deceleration assist control as the inter-vehicle distance control when the execution of the inter-vehicle distance control is requested by the driver operating the driving assist switch 81. The acceleration-and-deceleration assist control is one of the driving assist controls. The inter-vehicle distance control as the acceleration-and-deceleration assist control is a control to automatically accelerate or decelerate the vehicle 100 to cause the vehicle 100 to move so as to maintain the inter-vehicle distance D at a predetermined distance Dth, independently of the driver's operation to the acceleration pedal 41 or the brake pedal 42.

The inter-vehicle distance control is known in JP 2014-148293 A, JP 2006-315491 A, JP 4172434 B, JP 4929777 B, etc. Therefore, the inter-vehicle distance control will be briefly described below.

The embodiment control apparatus sets a target acceleration Gtgt, based on the inter-vehicle distance difference ΔD. The target acceleration Gtgt is the acceleration of the vehicle 100 to be a target. In this embodiment, the embodiment control apparatus sets the target acceleration Gtgt to a value greater than zero when the inter-vehicle distance ΔD is greater than zero.

The embodiment control apparatus sets (i) a target fuel injection amount Qtgt to a value greater than the currently-set target fuel injection amount Qtgt and (ii) a target brake hydraulic pressure Ptgt to zero when the target acceleration Gtgt is greater than zero. In this case, the embodiment control apparatus sets the target fuel injection amount Qtgt to the value which increases as the target acceleration Gtgt increases.

The target fuel injection amount Qtgt is an amount of the fuel to be injected from each fuel injector 11. The target brake hydraulic pressure Ptgt is the brake hydraulic pressure to be applied to each friction brake mechanism 21 from the respective brake actuator 22.

The embodiment control apparatus causes each fuel injector 11 to inject the target fuel injection amount Qtgt of the fuel and controls the brake hydraulic pressure applied to each friction brake mechanism 21 to zero. Thereby, the vehicle 100 is accelerated and as a result, the inter-vehicle distance D is decreased.

On the other hand, the embodiment control apparatus sets the target acceleration Gtgt to a value smaller than zero when the inter-vehicle distance ΔD is smaller than zero. The embodiment control apparatus sets (i) the target fuel injection amount Qtgt to zero and (ii) the target brake hydraulic pressure Ptgt to a value equal to or greater than zero when the target acceleration Gtgt is smaller than zero. In this case, the embodiment control apparatus sets the target brake hydraulic pressure Ptgt to zero when an absolute value of the target acceleration Gtgt is relatively small. On the other hand, the embodiment control apparatus sets the target brake hydraulic pressure Ptgt to the value greater than zero when the absolute value of the target acceleration Gtgt is relatively large.

The embodiment control apparatus causes the fuel injectors 11 to stop injecting the fuel and controls the brake hydraulic pressure applied to each friction brake mechanism 21 to the target brake hydraulic pressure Ptgt. Thereby, the vehicle 100 is decelerated and as a result, the inter-vehicle distance D is increased.

The embodiment control apparatus sets the target acceleration Gtgt to zero when the inter-vehicle distance difference ΔD is zero. In this case, the embodiment control apparatus sets the target fuel injection amount Qtgt to the currently-set target fuel injection amount Qtgt and sets the target brake hydraulic pressure Ptgt to zero.

The embodiment control apparatus causes each fuel injector 11 to inject the target fuel injection amount Qtgt of the fuel and controls the brake hydraulic pressure applied to each friction brake mechanism 21 to zero. Thereby, the vehicle 100 moves with maintaining the vehicle movement speed SPD at the current vehicle movement speed SPD and as a result, the inter-vehicle distance is maintained at the target inter-vehicle distance Dtgt.

<Normal Acceleration-and-Deceleration Control>

The embodiment control apparatus executes a normal acceleration-and-deceleration control to accelerate or decelerate the vehicle 100, based on (i) the acceleration pedal operation amount AP and (ii) the brake pedal operation amount BP when the driving assist switch 81 is set at the OFF position.

The embodiment control apparatus sets the target fuel injection amount Qtgt, based on (i) the acceleration pedal operation amount AP and (ii) the vehicle movement speed SPD when the acceleration pedal operation amount AP is greater than zero during an execution of the normal acceleration-and-deceleration control. The target fuel injection amount Qtgt increases as the acceleration pedal operation amount AP increases. In addition, the target fuel injection amount Qtgt increases as the vehicle movement speed SPD increases. The embodiment control apparatus sets the target fuel injection amount Qtgt to zero, independently of the vehicle movement speed SPD when the acceleration pedal operation amount AP is zero during the execution of the normal acceleration-and-deceleration control. Then, the embodiment control apparatus controls the activations of the fuel injector actuators 12 to cause each fuel injector 11 to inject the target fuel injection amount Qtgt of the fuel.

The embodiment control apparatus sets the target brake hydraulic pressure Ptgt such that the target brake hydraulic pressure Ptgt increases as the brake pedal operation amount BP increases when the brake pedal operation amount BP is greater than zero during the execution of the normal acceleration-and-deceleration control. On the other hand, the embodiment control apparatus sets the target brake hydraulic pressure Ptgt to zero when the brake pedal operation amount BP is zero during the execution of the normal acceleration-and-deceleration control. The embodiment control apparatus controls the activations of the brake actuators 22 to apply the brake hydraulic pressure corresponding to the target brake hydraulic pressure Ptgt to the friction brake mechanisms 21, respectively.

<Anti-Lock Control>

The embodiment control apparatus executes an anti-lock control as a deceleration slip rate reduction control in response to the deceleration slip rate SD of any of the vehicle wheels 50 becoming a large value in braking the vehicle 100. The anti-lock control is a control to automatically decrease the braking force applied to the vehicle wheel 50 having the large deceleration slip rate SD to reduce the deceleration slip rate SD in question.

<Anti-Lock Control and Normal Acceleration-and-Deceleration Control>

In this embodiment, the embodiment control apparatus executes the anti-lock control as follows when (i) the embodiment control apparatus does not executes the inter-vehicle distance control, i.e., executes the normal acceleration-and-deceleration control, and (ii) the deceleration slip rate SD of any of the vehicle wheels 50 becomes equal to or greater than a predetermined threshold SDth_1. Hereinafter; the predetermined threshold SDth_1 will be referred to as "the first threshold SDth_1, and the vehicle wheel 50 having the deceleration slip rate SD once becoming equal to or greater than the first threshold SDth_1 will be referred to as "the target vehicle wheel 50".

The first threshold SDth_1 is set to a value capable of preventing the driver from feeling uneasy due to automatically decreasing the brake hydraulic pressure in response to the deceleration slip rate SD reaching the first threshold SDth_1.

Figure 3:
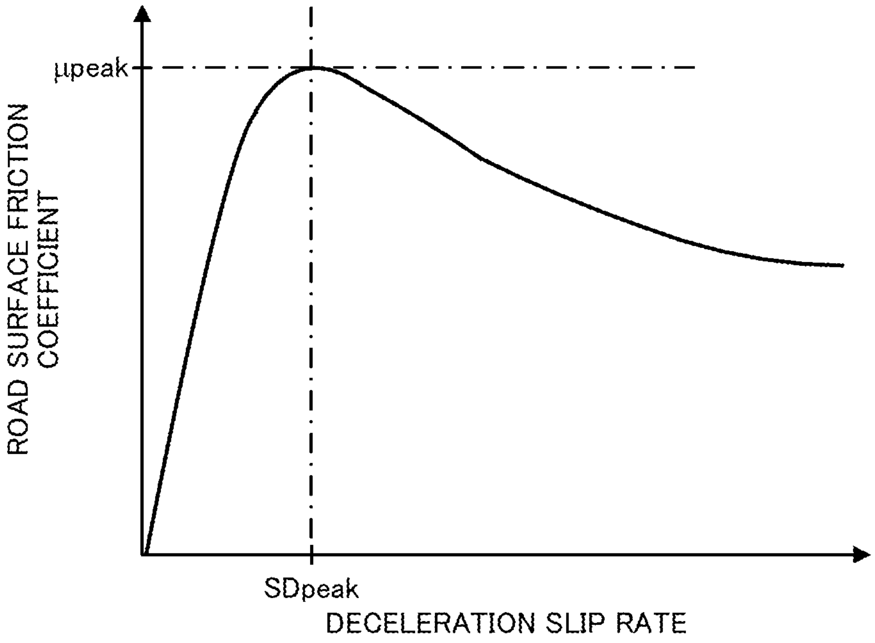
FIG. 3 is a view for showing a relationship between a deceleration slip rate and a road surface friction coefficient.

As shown in FIG. 3, a road friction coefficient μ increases as the deceleration slip rate SD increases from zero. The road friction coefficient μ is a friction coefficient between the vehicle wheel 50 and a road surface which the vehicle wheel 50 contacts. The road friction coefficient μ decreases as the deceleration slip rate SD increases when the deceleration slip rate SD is greater than a certain slip rate SDpeak. Therefore, the road friction coefficient μ is a maximum value μpeak when the deceleration slip rate SD is equal to the certain slip rate SDpeak. Hereinafter, the certain slip rate SDpeak will be referred to as "the deceleration peak slip rate SDpeak".

In this embodiment, the first threshold SDth_1 is set to a value greater than the deceleration peak slip rate SDpeak. In particular, the first threshold SDth_1 is set to the value greater than and near the deceleration peak slip rate SDpeak. In this embodiment, a difference ΔSDth_1 between the first threshold SDth_1 and the deceleration peak slip rate SDpeak is relatively small.

The embodiment control apparatus starts an execution of the anti-lock control to decrease the brake hydraulic pressure applied to the friction brake mechanism 21 provided to the target vehicle wheel 50 when (i) the embodiment control apparatus executes the normal acceleration-and-deceleration control, and (ii) the deceleration slip rate SD of any of the vehicle wheels 50 becomes equal to or greater than the first threshold SDth_1. Thereby, the deceleration slip rate SD of the target vehicle wheel 50 is reduced. Hereinafter, the friction brake mechanism 21 provided to the target vehicle wheel 50 will be referred to as "the target friction brake mechanism 21".

The embodiment control apparatus continues to decrease the brake hydraulic pressure applied to the target friction brake mechanism 21 until the deceleration slip rate SD of the target vehicle wheel 50 becomes smaller than the first threshold SDth_1.

The embodiment control apparatus stops decreasing the brake hydraulic pressure applied to the target friction brake mechanism 21 when the deceleration slip rate SD of the target vehicle wheel 50 becomes smaller than the first threshold SDth_1. Thereby, the embodiment control apparatus terminates the execution of the anti-lock control. Then, the embodiment control apparatus starts to increase the brake hydraulic pressure applied to the target friction brake mechanism 21 toward the target brake hydraulic pressure Ptgt.

Figure 4:
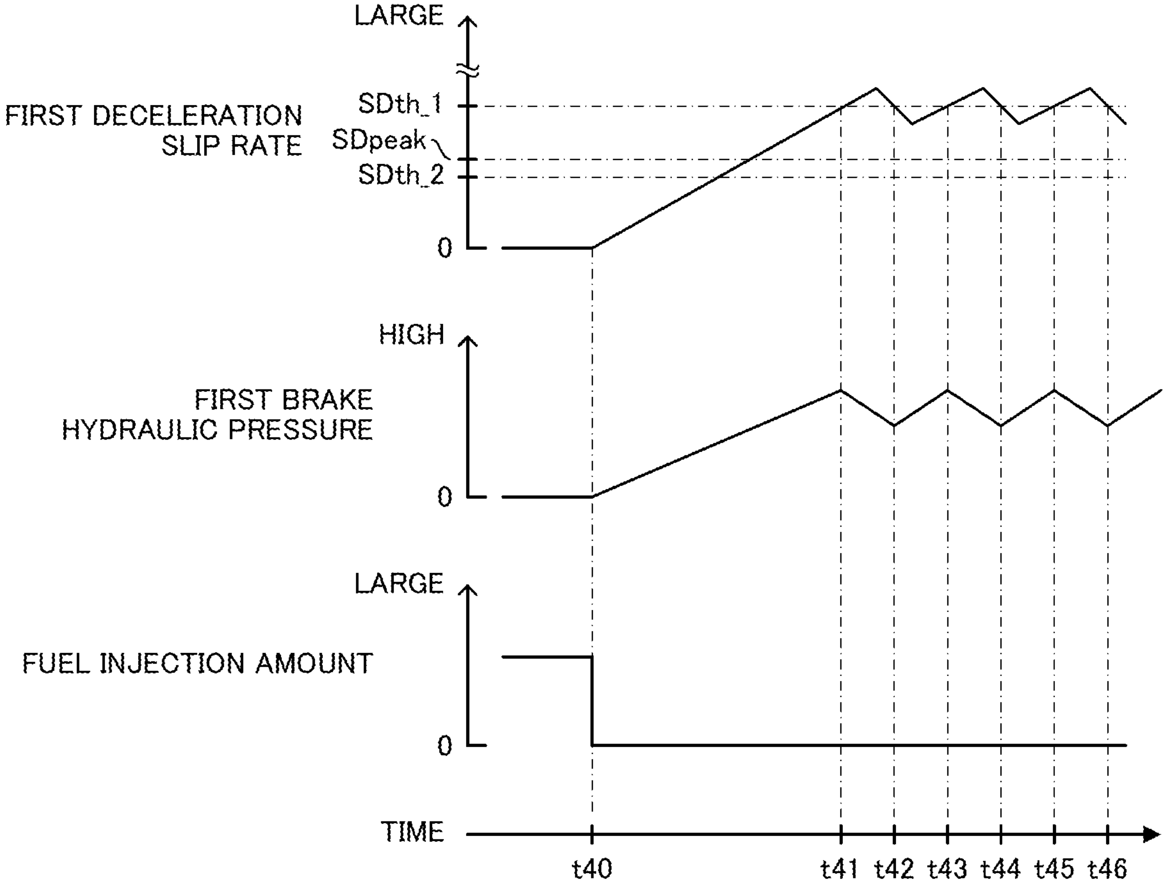
FIG. 4 is a view for showing a time chart used for describing an antilock control during an execution of a normal acceleration-and-deceleration control.

For example, the brake hydraulic pressure, etc. are controlled as shown in FIG. 4 when the anti-lock control is executed as described above. In an example shown in FIG. 4, the target vehicle wheel 50 is the left front wheel 51. At a point of time t40, the brake pedal operation amount BP starts to increase from zero. At a point of time t41, the first deceleration slip rate SD1, i.e., the deceleration slip rate SD of the left front wheel 51 reaches the first threshold SDth_1.

When the brake pedal operation amount BP starts to increase from zero at the point of time t40, the brake hydraulic pressure applied to the friction brake mechanism 21 provided to the left front vehicle wheel 51 starts to be increased from zero toward the target brake hydraulic pressure Ptgt, and the fuel injection amount is controlled to zero. Thereby, the first deceleration slip rate SD1 starts to increase. Hereinafter, the brake hydraulic pressure applied to the friction brake mechanism 21 provided to the left front vehicle wheel 51 will be referred to as "the first brake hydraulic pressure".

When the first deceleration slip rate SD1 reaches the first threshold SDth_1 at the point of time t41, the first brake hydraulic pressure starts to be decreased. Thereby, the first deceleration slip rate SD1 starts to decrease. When the first deceleration slip rate SD1 becomes smaller than the first threshold SDth_1 at a point of time t42, the first brake hydraulic pressure starts to be increased toward the target brake hydraulic pressure Ptgt. Thereby, the first deceleration slip rate SD1 starts to increase.

Thereafter, similarly, the first brake hydraulic pressure starts to be decreased at a point of time when the first deceleration slip rate SD1 reaches the first threshold SDth_1 (see points of time t43 and t45). In addition, the first brake hydraulic pressure starts to be increased at a point of time when the first deceleration slip rate SD1 becomes smaller than the first threshold SDth_1 (see points of time t44 and t46).

<Anti-Lock Control and Inter-Vehicle Distance Control>

On the other hand, the embodiment control apparatus executes the anti-lock control as follows when (i) the embodiment control apparatus executes the inter-vehicle distance control, and (ii) the deceleration slip rate SD of any of the vehicle wheels 50 becomes equal to or greater than a predetermined threshold SDth_2. The predetermined threshold SDth_2 is set to a value smaller than the first threshold SDth_1. Hereinafter, the predetermined threshold SDth_2 will be referred to as "the second threshold SDth_2", and the vehicle wheel 50 having the deceleration slip rate SD once becoming equal to or greater than the second threshold SDth_2 will be also referred to as "the target vehicle wheel 50".

The second threshold SDth_2 is set to a value capable of controlling an average of the deceleration slip rates SD of the target vehicle wheel 50 to the deceleration peak slip rate SDpeak by (i) decreasing the brake hydraulic pressure applied to the friction brake mechanism 21 provided to the target vehicle wheel 50 in response to the deceleration slip rate SD reaching the second threshold SDth_2 and (ii) increasing the brake hydraulic pressure applied to the friction brake mechanisms 21 provided to the target vehicle wheel 50 in response to the deceleration slip rate SD becoming smaller than the second threshold SDth_2. In this embodiment, the second threshold SDth_2 is set to the value smaller than the deceleration peak slip rate SDpeak. In particular, the second threshold SDth_2 is set to the value smaller than and near the deceleration peak slip rate SDpeak. In this embodiment, a difference ΔSDth_2 between the second threshold SDth_2 and the deceleration peak slip rate SDpeak is relatively small.

The embodiment control apparatus starts the execution of the anti-lock control to decrease the brake hydraulic pressure applied to the friction brake mechanism 21 provided to the target vehicle wheel 50 when (i) the embodiment control apparatus executes the inter-vehicle distance control, and (ii) the deceleration slip rate SD of any of the vehicle wheels 50 becomes equal to or greater than the second threshold SDth_2. Thereby, the deceleration slip rate SD of the target vehicle wheel 50 is reduced. Hereinafter the friction brake mechanism 21 provided to the target vehicle wheel 50 in this example will be also referred to as "the target friction brake mechanism 21".

The embodiment control apparatus continues to decrease the brake hydraulic pressure applied to the target friction brake mechanism 21 until the deceleration slip rate SD of the target vehicle wheel 50 becomes smaller than the second threshold SDth_2.

The embodiment control apparatus stops decreasing the brake hydraulic pressure applied to the target friction brake mechanism 21 when the deceleration slip rate SD of the target vehicle wheel 50 becomes smaller than the second threshold SDth_2. Thereby, the embodiment control apparatus terminates the execution of the anti-lock control. Then, the embodiment control apparatus starts to increase the brake hydraulic pressure applied to the target friction brake mechanism 21 toward the target brake hydraulic pressure Ptgt.

Figure 5:
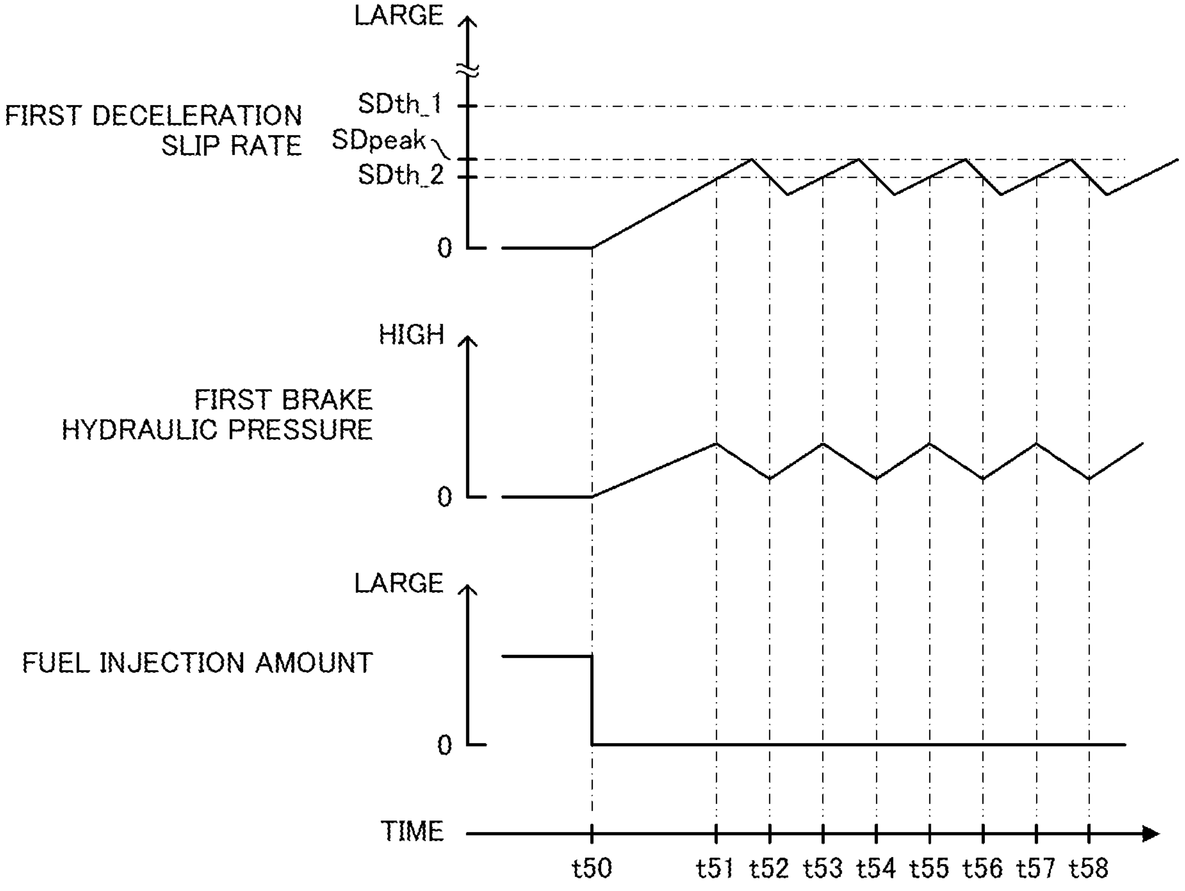
FIG. 5 is a view for showing a time chart used for describing the antilock control during an execution of an inter-vehicle distance control.

For example, the brake hydraulic pressure, etc. are controlled as shown in FIG. 5 when the anti-lock control is executed as described above. In an example shown in FIG. 5, the target vehicle wheel 50 is the left front vehicle wheel 51. At a point of time t50, the brake pedal operation amount BP starts to increase from zero. At a point of time t51, the first deceleration slip rate SD1, i.e., the deceleration slip rate SD of the left front vehicle wheel 51 reaches the second threshold SDth_2.

When the brake pedal operation amount BP starts to increase from zero at the point of time t50, the first brake hydraulic pressure starts to be increased from zero toward the target brake hydraulic pressure Ptgt, and the fuel injection amount is controlled to zero. Thereby, the first deceleration slip rate SD1 starts to increase.

When the first deceleration slip rate SD1 reaches the second threshold SDth_2 at the point of time t51, the first brake hydraulic pressure starts to be decreased. Thereby, the first deceleration slip rate SD1 starts to decrease. When the first deceleration slip rate SD1 becomes smaller than the second threshold SDth_2 at a point of time t52, the first brake hydraulic pressure starts to be increased toward the target brake hydraulic pressure Ptgt. Thereby, the first deceleration slip rate SD1 starts to increase.

Thereafter, similarly, the first brake hydraulic pressure starts to be decreased at a point of time when the first deceleration slip rate SD1 reaches the second threshold SDth_2 (see points of time t53, t55, and t57). In addition, the first brake hydraulic pressure starts to be increased at a point of time when the first deceleration slip rate SD1 becomes smaller than the second threshold SDth_2 (see points of time t54, t56, and t58).

The driver presses down the brake pedal 42 for braking the vehicle 100 when the normal acceleration-and-deceleration control is executed. Thus, the driver may feel that the braking to the vehicle 100 does not fit the driver's operation to the brake pedal 42 and feel uneasy if the brake hydraulic pressure is automatically decreased before the deceleration slip rate SD exceeds the deceleration peak slip rate SDpeak.

In this embodiment, the first threshold SDth_1 is set to the value greater than the deceleration peak slip rate SDpeak and capable of preventing the driver from feeling uneasy as to the braking to the vehicle 100 due to automatically decreasing the brake hydraulic pressure in response to the deceleration slip rate SD reaching the first threshold SDth_1.

Therefore, the deceleration slip rate SD reaches the first threshold SDth_1 after the deceleration slip rate SD in question exceeds the deceleration peak slip rate SDpeak when the normal acceleration-and-deceleration control is executed. Thus, the brake hydraulic pressure is automatically decreased after the deceleration slip rate SD exceeds the deceleration peak slip rate SDpeak. Therefore, the driver can be prevented from feeling uneasy due to automatically decreasing the brake hydraulic pressure.

On the other hand, the driver does not press down the brake pedal 42 for braking the vehicle 100 when the driving assist control is executed. Thus, the driver is unlikely to feel uneasy even if the brake hydraulic pressure is automatically decreased before the deceleration slip rate SD exceeds the deceleration peak slip rate SDpeak.

In this embodiment, the second threshold SDth_2 is set to the value smaller than and near the deceleration peak slip rate SDpeak and capable of controlling the average of the deceleration slip rates SD of the target vehicle wheel 50 to the deceleration peak slip rate SDpeak by (i) decreasing the brake hydraulic pressure applied to the target friction brake mechanism 21 in response to the deceleration slip rate SD of the target vehicle wheel 50 reaching the second threshold SDth_2 and (ii) increasing the brake hydraulic pressure applied to the target friction brake mechanism 21 in response to the deceleration slip rate SD of the target vehicle wheel 50 becoming smaller than the second threshold SDth_2.

Therefore, the average of the deceleration slip rates SD of the target vehicle wheel 50 may be controlled to the deceleration peak slip rate SDpeak during an execution of the driving, assist control. Thus, the vehicle 100 can be braked appropriately with preventing the driver from feeling uneasy due to automatically decreasing the brake hydraulic pressure.

<Traction Control>

Further, the embodiment control apparatus executes a traction control as an acceleration slip rate reduction control in response to the acceleration slip rate SA of any of the vehicle wheels 50 becoming a large value in accelerating the vehicle 100. The traction control as the acceleration slip rate reduction control is a control to automatically apply the braking force to the vehicle wheel 50 having the large acceleration slip rate SA and automatically decrease the driving force applied to the left and right front vehicle wheels 51 and 52 as the driven vehicle wheels 50 to reduce the acceleration slip rate SA in question.

<Traction Control and Normal Acceleration-and-Deceleration Control>

In this embodiment, the embodiment control apparatus executes the traction control as follows when (i) the embodiment control apparatus does not execute the inter-vehicle distance control, i.e., executes the normal acceleration-and-deceleration control, and (ii) the acceleration slip rate SA of any of the vehicle wheels 50 becomes equal to or greater than a predetermined threshold SAth_1. Hereinafter, the predetermined threshold SAth_1 will be referred to as "the first threshold SAth_1", and the vehicle wheel 50 having the acceleration slip rate SA once becoming equal to or greater than the first threshold SAth_1 will be also referred to as "the target vehicle wheel 50".

The first threshold SAth_1 is set to a value capable of preventing the driver from feeling uneasy as to the acceleration of the vehicle 100 due to automatically decreasing the fuel injection amount and automatically decreasing the brake hydraulic pressure in response to the acceleration slip rate SA reaching the first threshold SAth_1.

Similar to the relationship between the deceleration slip rate SD and the road surface friction coefficient μ, the road surface friction coefficient μ increases as the acceleration slip rate SA increases from zero. The road surface friction coefficient μ decreases as the acceleration slip rate SA increases when the acceleration slip rate SA is greater than a certain slip rate SApeak. Therefore, the road surface friction coefficient μ is a maximum value when the acceleration slip rate SA is equal to the certain slip rate SApeak. Hereinafter, the certain slip rate SApeak will be referred to as "the acceleration peak slip rate SApeak".

In this embodiment, the first threshold SAth_1 is set to the value greater than the acceleration peak slip rate SApeak. In particular, the first threshold SAth_1 is set to the value greater than and near the acceleration peak slip rate SApeak. In this embodiment, a difference ΔSAth_1 between the first threshold SAt_1 and the acceleration peak slip rate SApeak is relatively small.

The embodiment control apparatus starts an execution of the traction control to apply the brake hydraulic pressure to the friction brake mechanism 21 provided to the target vehicle wheel 50 and decreases the fuel injection amount when (i) the embodiment control apparatus executes the normal acceleration-and-deceleration control, and (ii) the acceleration slip rate SA of any of the vehicle wheels 50 becomes equal to or greater than the first threshold SAth_1. Thereby, the acceleration slip rate SA of the target vehicle wheel 50 is reduced. Hereinafter, the friction brake mechanism 21 provided to the target vehicle wheel 50 in this example will be also referred to as "the target friction brake mechanism 21".

The embodiment control apparatus continues to increase the brake hydraulic pressure applied to the target friction brake mechanism 21 and continues to decrease the fuel injection amount until the acceleration slip rate SA of the target vehicle wheel 50 becomes smaller than the first threshold SAth_1.

The embodiment control apparatus stops applying the brake hydraulic pressure to the target friction brake mechanism 21 and starts to increase the fuel injection amount toward the target fuel injection amount Qtgt when the acceleration slip rate SA of the target vehicle wheel 50 becomes smaller than the first threshold SAth_1. Thereby, the embodiment control apparatus terminates the execution of the traction control.

Figure 6:
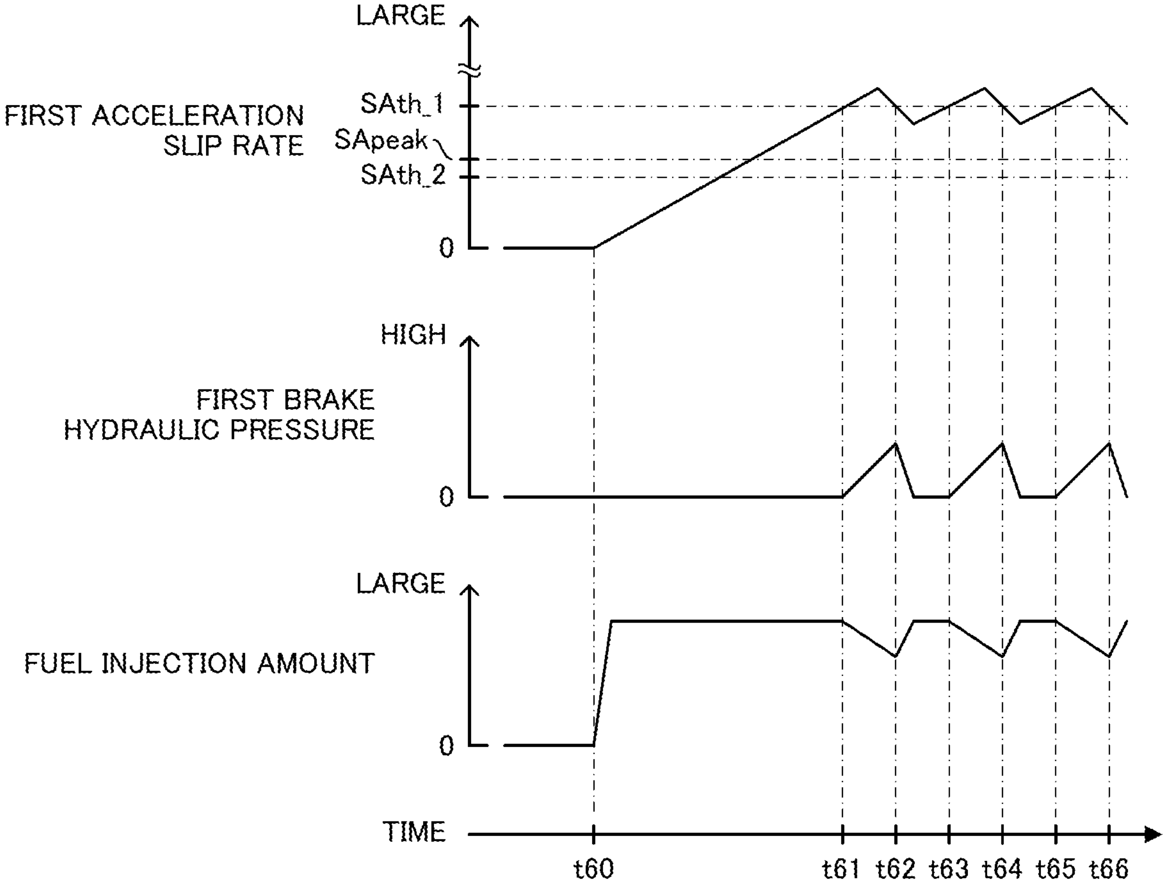
FIG. 6 is a view for showing a time chart used for describing a traction control during the execution of the normal acceleration-and-deceleration control.

For example, the brake hydraulic pressure, etc. are controlled as shown in FIG. 6 when the traction control is executed as described above. In an example shown in FIG. 6, the target vehicle wheel 50 is the left front vehicle wheel 51. At a point of time t60, the acceleration pedal operation amount AP starts to increase from zero. At a point of time t61, the first acceleration slip rate SA1, i.e., the acceleration slip rate SA of the left front vehicle wheel 51 reaches the first threshold SAth_1.

When the acceleration pedal operation amount AP starts to increase from zero at the point of time t60, the fuel injection amount starts to be increased toward the target fuel injection amount Qtgt. At this moment, the first brake hydraulic pressure is controlled to zero. Thereby, the first acceleration slip rate SA1 starts to increase.

When the first acceleration slip rate SA1 reaches the first threshold SAth_1 at the point of time t61, the first brake hydraulic pressure starts to be increased, and the fuel injection amount starts to be decreased. Thereby, the first acceleration slip rate SA1 starts to decrease. When the first acceleration slip rate SA1 becomes smaller than the first threshold SAth_1 at a point of time t62, the first brake hydraulic pressure starts to be decreased, and the fuel injection amount starts to be increased toward the target fuel injection amount Qtgt. Thereby, the first acceleration slip rate SA1 starts to increase.

Thereafter, similarly, the first brake hydraulic pressure starts to be increased, and the fuel injection amount starts to be decreased at a point of time when the first acceleration slip rate SA1 reaches the first threshold SAth_1 (see points of time t63 and t65). In addition, the first brake hydraulic pressure starts to be decreased, and the fuel injection amount starts to be increased at a point of time when the first acceleration slip rate SA1 becomes smaller than the first threshold SAth_1 (see points of time t64 and t66).

<Traction Control and Inter-Vehicle Distance Control>

The embodiment control apparatus executes the traction control as follows when (i) the embodiment control apparatus executes the inter-vehicle distance control, and (ii) the acceleration slip rate SA of any of the vehicle wheels 50 becomes equal to or greater than a predetermined threshold SAth_2. Hereinafter, the predetermined threshold SAth_2 will be referred as to "the second threshold SAth_2", and the vehicle wheel 50 having the acceleration slip rate SA once becoming equal to or greater than the second threshold SAth_2 will be also referred to as "the target vehicle wheel 50".

The second threshold SAth_2 is set to a value capable of controlling an average of the acceleration slip rates SA of the target vehicle wheel 50 to the acceleration peak slip rate SApeak by (i) decreasing the fuel injection amount and increasing the brake hydraulic pressure applied to the friction brake mechanism 21 provided to the target vehicle wheel 50 in response to the acceleration slip rate SA reaching the second threshold SAth_2 and (ii) increasing the fuel injection amount and decreasing the brake hydraulic pressure applied to the friction brake mechanism 21 provided to the target vehicle wheel 50 in response to the acceleration slip rate SA becoming smaller than the second threshold SAth_2. In this embodiment, the second threshold SAth_2 is set to the value smaller than the acceleration peak slip rate SApeak. In particular, the second threshold SAth_2 is set to the value smaller than and near the acceleration peak slip rate SApeak. In this embodiment, a difference ΔSAth_2 between the second threshold SAth_2 and the acceleration peak slip rate SApeak is relatively small.

The embodiment control apparatus starts the execution of the traction control to apply the brake hydraulic pressure to the friction brake mechanism 21 provided to the target vehicle wheel 50 and decreases the fuel injection amount when (i) the embodiment control apparatus executes the inter-vehicle distance control, and (ii) the acceleration slip rate SA of any of the vehicle wheels 50 becomes equal to or greater than the second threshold SAth_2. Thereby, the acceleration slip rate SA of the target vehicle wheel 50 is reduced. Hereinafter, the friction brake mechanism 21 provided to the target vehicle wheel 50 in this example will be also referred to as "the target friction brake mechanism 21".

The embodiment control apparatus continues to increase the brake hydraulic pressure applied to the target friction brake mechanism 21 and continues to decrease the fuel injection amount until the acceleration slip rate SA of the target vehicle wheel 50 becomes smaller than the second threshold SAth_2.

The embodiment control apparatus stops applying the brake hydraulic pressure to the target friction brake mechanism 21 and starts to increase the fuel injection amount toward the target fuel injection amount Qtgt when the acceleration slip rate SA of the target vehicle wheel 50 becomes smaller than the second threshold SAth_2. Thereby, the embodiment control apparatus terminates the execution of the traction control.

Figure 7:
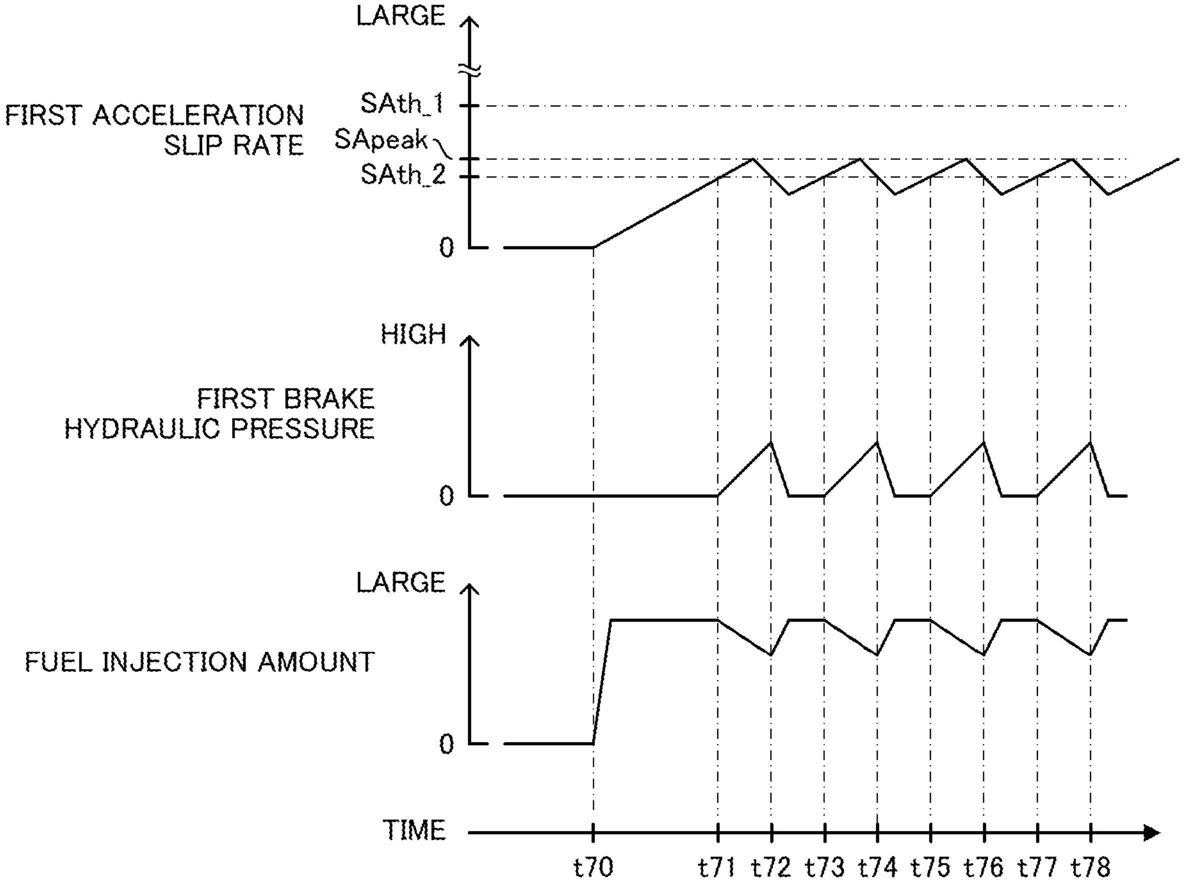
FIG. 7 is a view for showing a time chart used for describing the traction control during the execution of the inter-vehicle distance control.

For example, the brake hydraulic pressure, etc. are controlled as shown in FIG. 7 when the traction control is executed as described above. In an example shown in FIG. 7, the target vehicle wheel 50 is the left front vehicle wheel 51. At a point of time t70, the acceleration pedal operation amount AP starts to increase from zero. At a point of time t71, the first acceleration slip rate SA1, i.e., the acceleration slip rate SA of the left front vehicle wheel 51 reaches the second threshold SAth_2.

When the acceleration pedal operation amount AP starts to increase from zero at the point of time t70, the fuel injection amount starts to be increased toward the target fuel injection amount Qtgt. At this moment, the first brake hydraulic pressure is controlled to zero. Thereby, the first acceleration slip rate SA1 starts to increase.

When the first acceleration slip rate SA1 reaches the second threshold SAth_2 at the point of time t71, the first brake hydraulic pressure starts to be increased, and the fuel injection amount starts to be decreased. Thereby, the first acceleration slip rate SA1 starts to decrease. When the first acceleration slip rate SA1 becomes smaller than the second threshold SAth_2 at a point of time t72, the first brake hydraulic pressure starts to be decreased, and the fuel injection amount starts to be increased toward the target fuel injection amount Qtgt. Thereby, the first acceleration slip rate SA1 starts to increase.

Thereafter, similarly, the first brake hydraulic pressure starts to be increased, and the fuel injection amount starts to be decreased at a point of time when the first acceleration slip rate SA1 reaches the second threshold SAth_2 (see points of time t73, t75, and t77). In addition, the first brake hydraulic pressure starts to be decreased, and the fuel injection amount starts to be increased at a point of time when the first acceleration slip rate SA1 becomes smaller than the second threshold SAth_2 (see points of time t74, t76, and t78).

The driver presses down the acceleration pedal 41 for accelerating the vehicle 100 when the normal acceleration-and-deceleration control is executed. Thus, the driver may feel that the acceleration of the vehicle 100 does not fit the driver's operation to the acceleration pedal 41 and feel uneasy if the fuel injection amount is automatically decreased, and the brake hydraulic pressure is automatically increased before the acceleration slip rate SA becomes greater than the acceleration peak slip rate SApeak.

In this embodiment, the first threshold SAth_1 is set to the value greater than the acceleration peak slip rate SApeak and capable of preventing the driver from feeling uneasy as to the acceleration of the vehicle 100 due to automatically decreasing the fuel injection amount and automatically increasing the brake hydraulic pressure in response to the acceleration slip rate SA reaching the first threshold SAth_1.

Therefore, the acceleration slip rate SA reaches the first threshold SAth_1 after the acceleration slip rate SA in question exceeds the acceleration peak slip rate SApeak when the normal acceleration-and-deceleration control is executed. Thus, the fuel injection amount is automatically decreased, and the brake hydraulic pressure is automatically increased after the acceleration slip rate SA exceeds the acceleration peak slip rate SApeak. Therefore, the driver can be prevented from feeling uneasy due to automatically decreasing the fuel injection amount and automatically increasing the brake hydraulic pressure.

On the other hand, the driver does not press down the acceleration pedal 41 for accelerating the vehicle 100 when the inter-vehicle distance control is executed. Thus, the driver is unlikely to feel uneasy even if the fuel injection amount is automatically decreased, and the brake hydraulic pressure is automatically increased before the acceleration slip rate SA exceeds the acceleration peak slip rate SApeak.

In this embodiment, the second threshold SAth_2 is set to the value smaller than and near the acceleration peak slip rate SApeak and capable of controlling the average of the acceleration slip rates SA of the target vehicle wheel 50 to the acceleration peak slip rate SApeak by (i) decreasing the fuel injection amount and increasing the brake hydraulic pressure in response to the acceleration slip rate SA reaching the second threshold SAth_2 and (ii) increasing the fuel injection amount and decreasing the brake hydraulic pressure in response to the acceleration slip rate SA of the target vehicle wheel 50 becoming smaller than the second threshold SAth_2.

Therefore, the average of the acceleration slip rates SA of the target vehicle wheel 50 may be controlled to the acceleration peak slip rate SApeak during the execution of the inter-vehicle distance control. Thus, the vehicle 100 can be accelerated appropriately with preventing the driver from feeling uneasy due to automatically decreasing the fuel injection amount and automatically increasing the brake hydraulic pressure.

<Vehicle Behavior Control>

Further, the embodiment control apparatus executes a vehicle behavior control as a lateral slip rate reduction control in response to a lateral slip rate SL of any of the vehicle wheels 50 becoming a large rate in turning the vehicle 100. The vehicle behavior control as the lateral slip rate reduction control is a control to automatically apply the braking force to one or more of the vehicle wheels 50 and automatically decrease the driving force applied to the left and right front vehicle wheels 51 and 52 as the driven vehicle wheels 50 to reduce the lateral slip rate SL in question. In this embodiment, the lateral slip rate SL is a parameter representing a difference between an orientation and a movement direction of each vehicle wheel 50. As described later, the lateral slip rate SL is acquired, based on at least one of (i) the slip angle θslip, (ii) the slip angle rate ωslip, and (iii) the expected yaw rate difference Δδexp.

<Vehicle Behavior Control, Normal Steering Control, and Oversteer>

In this embodiment, the embodiment control apparatus executes the vehicle behavior control as follows when (i) the embodiment control apparatus does not execute the lane keep control, i.e., executes the normal steering control, (ii) the slip angle θslip has become equal to or greater than a predetermined threshold θth_1, and (iii) the slip angle rate ωslip has become equal to or greater than a predetermined threshold ωth_1. Hereinafter, the predetermined threshold θth_1 will be referred to as "the first threshold θth_1", and the predetermined threshold ωth_1 will be referred to as "the first threshold ωth_t.

The first threshold θth_1 and the first threshold ωth_1 are set to values, respectively capable of preventing the driver from feeling uneasy as to turn of the vehicle 100 due to automatically decreasing the fuel injection amount and automatically increasing the brake hydraulic pressure in response to the slip angle θslip having reached the first threshold θth_1, and the slip angle rate ωslip having reached the first threshold ωth_1.

Similar to the relationship between the deceleration slip rate SD and the road surface friction coefficient μ, the road surface friction coefficient μ increases as the lateral slip rate SL increases from zero. The road surface friction coefficient μ decreases as the lateral slip rate SL increases when the lateral slip rate SL is greater than a certain slip rate SLpeak. Therefore, the road surface friction coefficient μ is a maximum value when the lateral slip rate SL is equal to the certain slip rate SLpeak. Hereinafter, the certain slip rate SLpeak will be referred to as "the lateral peak slip rate SLpeak".

In this embodiment, the first threshold θth_1 and the first threshold ωth_1 are set to the slip angle θslip and the slip angle rate ωslip, respectively corresponding to the lateral slip rate SL greater than the lateral peak slip rate SLpeak. In particular, the first threshold θth_1 and the first threshold ωth_1 are set to the slip angle θslip and the slip angle rate ωslip, respectively corresponding to the lateral slip rate SL greater than and near the lateral peak slip rate SLpeak. In this embodiment, a difference ΔSL_1 between (i) the lateral slip rate SL corresponding to the first threshold θth_1 and the first threshold ωth_1 and (ii) the lateral peak slip rate SLpeak is relatively small.

The embodiment control apparatus determines that the lateral slip rates SL of the left and right rear vehicle wheels 53 and 54 are large when (i) the embodiment control apparatus executes the normal steering control, (ii) the slip angle θslip has become equal to or greater than the first threshold θth_1, and (iii) the slip angle rate ωslip has become equal to or greater than the first threshold ωth_1. In this case, the embodiment control apparatus executes the vehicle behavior control to (i) apply the brake hydraulic pressure to the friction brake mechanism 21 provided to the front vehicle wheel 51 or 52 located outwardly relative to a turn direction of the vehicle 100 and (ii) decrease the fuel injection amount. Hereinafter, the front vehicle wheel 51 or 52 located outwardly relative to the turn direction of the vehicle 100 in this example will be also referred to as "the target vehicle wheel 50", and the friction brake mechanism 21 provided to the target vehicle wheel 50 in this example will be also referred to as "the target friction brake mechanism 21".

Thereby, the lateral slip rates SL of the left and right rear vehicle wheels 53 and 54 are reduced. As a result, the slip angle θslip and the slip angle rate ωslip decrease.

The embodiment control apparatus continues to increase the brake hydraulic pressure applied to the target friction brake mechanism 21 and continues to decrease the fuel injection amount until (i) the slip angle θslip becomes smaller than the first threshold θth_1, or (ii) the slip angle rate ωslip becomes smaller than the first threshold ωth_1.

The embodiment control apparatus stops applying the brake hydraulic pressure to the target friction brake mechanism 21 and starts to increase the fuel injection amount toward the target fuel injection amount Qtgt when (i) the slip angle θslip becomes smaller than the first threshold θth_1, or (ii) the slip angle rate ωslip becomes smaller than the first threshold ωth_1. Thereby, the embodiment control apparatus terminates an execution of the vehicle behavior control.

Figure 8:
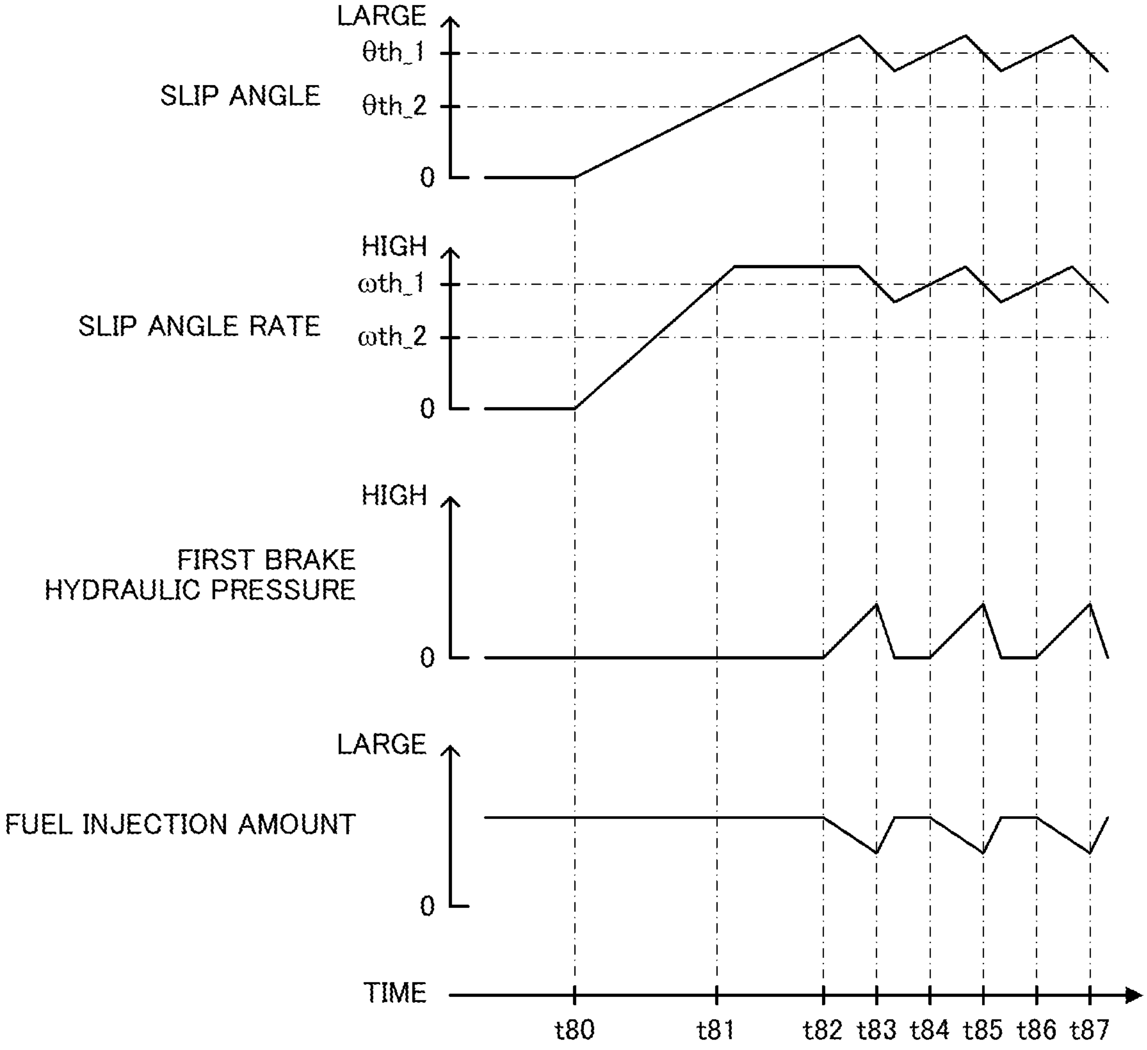
FIG. 8 is a view for showing a time chart used for describing a vehicle stability control during the execution of the normal acceleration-and-deceleration control.

For example, the brake hydraulic pressure, etc. are controlled as shown in FIG. 8 when the vehicle behavior control is executed as described above. In an example shown in FIG. 8, the target vehicle wheel 50 is the left front vehicle wheel 51. At a point of time t80 while the vehicle 100 turns, the slip angle θslip and the slip angle rate ωslip start to increase. At a point of time t81, the slip angle rate ωslip reaches the first threshold ωth_1. At a point of time t82, the slip angle θslip reaches the first threshold θth_1.

When the slip angle θslip reaches the first threshold θth_1 at the point of time t82 after the slip angle rate ωslip reaches the first threshold ωth_1 at the point of time t81, the slip angle rate ωslip is equal to or greater than the first threshold ωth_1, and the slip angle θslip is equal to or greater than the first threshold θth_1. Therefore, at the point of time t82, the first brake hydraulic pressure starts to be increased, and the fuel injection amount starts to be decreased. Thereby, the slip angle θslip and the slip angle rate ωslip start to decrease. When (i) the slip angle θslip becomes smaller than the first threshold θth_1, and (ii) the slip angle rate ωslip becomes smaller than the first threshold ωth_1 at a point of time t83, the first brake hydraulic pressure starts to be decreased, and the fuel injection amount starts to be increased toward the target fuel injection amount Qtgt. Thereby, the slip angle θslip and the slip angle rate ωslip start to increase.

Thereafter, similarly, the first brake hydraulic pressure starts to be increased, and the fuel injection amount starts to be decreased at a point of time when (i) the slip angle θslip has reached the first threshold θth_1, and (ii) the slip angle rate ωslip has reached the first threshold ωth_1 (see points of time t84 and t86). In addition, the first brake hydraulic pressure starts to be decreased, and the fuel injection amount starts to be increased at a point of time when (i) the slip angle θslip becomes smaller than the first threshold θth_1, or (ii) the slip angle rate ωslip becomes smaller than the first threshold ωth_1 (see points of time t85 and t87).

<Vehicle Behavior Control, Lane Keep Control, and Oversteer>

On the other hand, the embodiment control apparatus executes the vehicle behavior control as follows when (i) the embodiment control apparatus executes the lane keep control, (ii) the slip angle θslip has become equal to or greater than a predetermined threshold θth_2, and (iii) the slip angle rate ωslip has become equal to or greater than a predetermined threshold θth_2. Hereinafter, the predetermined threshold θth_2 will be referred to as "the second threshold θth_2", and the predetermined threshold ωth_2 will be referred to as "the second threshold ωth_2. The second threshold θth_2 is set to a value smaller than the first threshold θth_1, and the second threshold ωth_2 is set to a value smaller than the first threshold θth_1.

The second threshold θth_2 and the second threshold ωth_2 are set to values, respectively capable of controlling an average of the lateral slip rates SL of each of the left and right rear wheels 53 and 54 to the lateral peak slip rate SLpeak by (i) decreasing the fuel injection amount and increasing the brake hydraulic pressure in response to the slip angle θslip having reached the second threshold θth_2, and the slip angle rate ωslip having reached the second threshold ωth_2, and (ii) increasing the fuel injection amount and decreasing the brake hydraulic pressure in response to the slip angle θslip becoming smaller than the second threshold θth_2, or the slip angle rate ωslip becoming smaller than the second threshold θth_2. In this embodiment, the second threshold θth_2 and the second threshold ωth_2 are set to the slip angle θslip and the slip angle rate ωslip, respectively corresponding to the lateral slip rate SL smaller than the lateral peak slip rate SLpeak. In particular, the second threshold θth_2 and the second threshold ωth_2 are set to the slip angle θslip and the slip angle rate ωslip, respectively corresponding to the lateral slip rate SL smaller than and near the lateral peak, slip rate SLpeak. In this embodiment, a difference ΔSL_2 between (i) the lateral slip rate SL corresponding to the second threshold θth_2 and the second threshold ωth_2 and (ii) the lateral peak slip rate SLpeak.

The embodiment control apparatus determines that the lateral slip rates SL of the left and right rear vehicle wheels 53 and 54 are large when (i) the embodiment control apparatus executes the lane keep control, (ii) the slip angle θslip has become equal to or greater than the second threshold θth_2, and (iii) the slip angle rate ωslip has become equal to or greater than the second threshold ωth_2. In this case, the embodiment control apparatus executes the vehicle behavior control to (i) apply the brake hydraulic pressure to the friction brake mechanism 21 provided to the front vehicle wheel 51 or 52 located outwardly relative to the turn direction of the vehicle 100 and (ii) decrease the fuel injection amount. Hereinafter, the front vehicle wheel 51 or 52 located outwardly relative to the turn direction of the vehicle 100 in this example will be also referred to as "the target vehicle wheel 50", and the friction brake mechanism 21 provided to the target vehicle wheel 50 in this example will be also referred to as "the target friction brake mechanism 21".

Thereby, the lateral slip rates SL of the left and right rear vehicle wheels 53 and 54 is reduced. As a result, the slip angle θslip and the slip angle rate ωslip decrease.

The embodiment control apparatus continues to increase the brake hydraulic pressure applied to the target friction brake mechanism 21 and continues to decrease the fuel injection amount until (i) the slip angle θslip becomes smaller than the second threshold θth_2, or (ii) the slip angle rate ωslip becomes smaller than the second threshold θth_2.

The embodiment control apparatus stops applying the brake hydraulic pressure to the target friction brake mechanism 21 and starts to increase the fuel injection amount toward the target fuel injection amount Qtgt when (i) the slip angle θslip becomes smaller than the second threshold θth_2, or (ii) the slip angle rate ωslip becomes smaller than the second threshold ωth_2. Thereby, the embodiment control apparatus terminates the execution of the vehicle behavior control.

Figure 9:
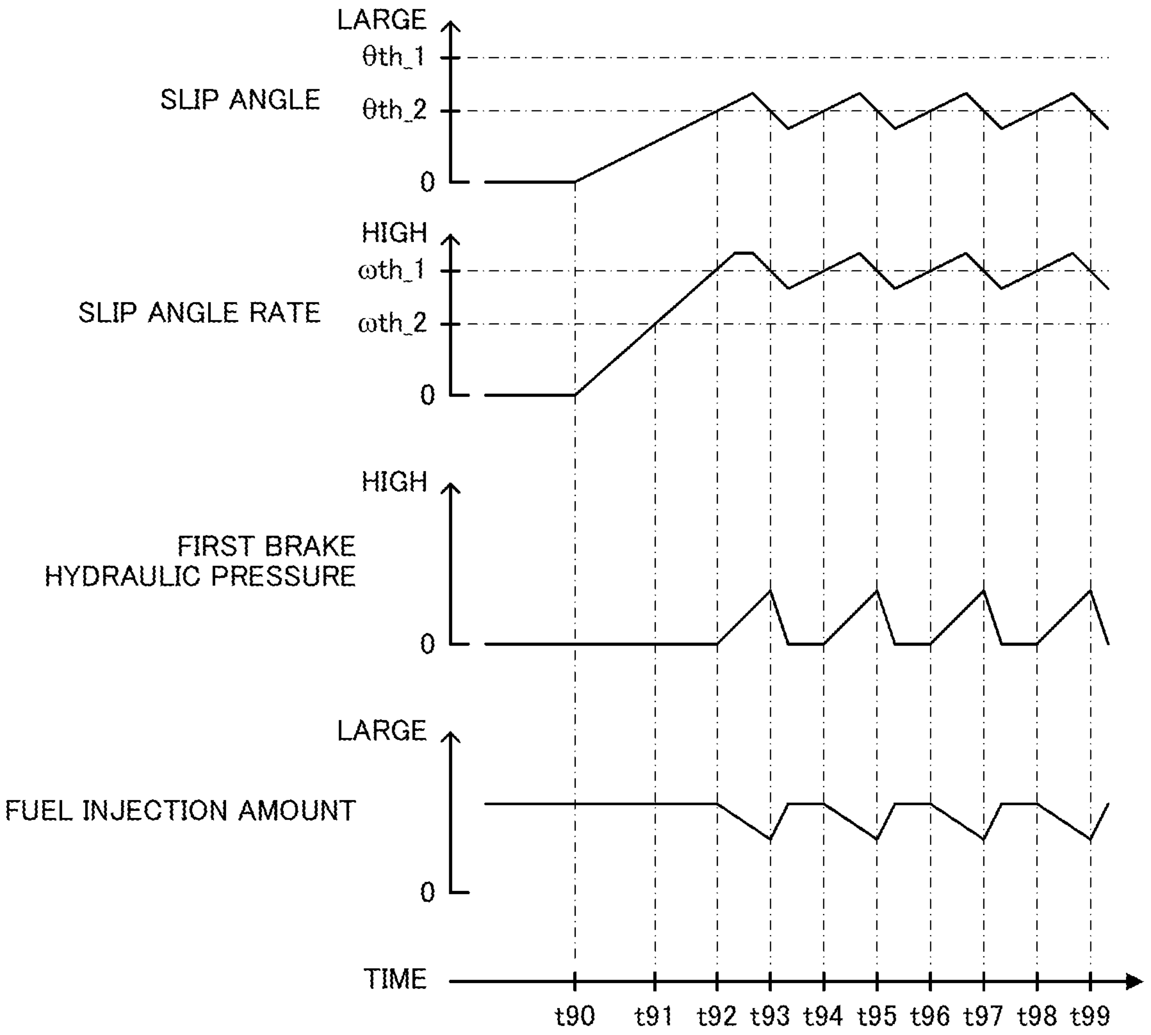
FIG. 9 is a view for showing a time chart used for describing the vehicle stability control during an execution of a lane keep control.

For example, the brake hydraulic pressure, etc. are controlled as shown in FIG. 9 when the vehicle behavior control is executed as described above. In an example shown in FIG. 9, the target vehicle wheel 50 is the left front vehicle wheel 51. At a point of time t90 while the vehicle 100 turns, the slip angle θslip and the slip angle rate ωslip start to increase. At a point of time t91, the slip angle rate ωslip reaches the second threshold ωth_2. At a point of time t92, the slip angle θslip reaches the second threshold θth_2.

When the slip angle θslip reaches the second threshold θth_2 at the point of time t92 after the slip angle rate ωslip reaches the second threshold ωth_2 at the point of time t91, the slip angle rate ωslip is equal to or greater than the second threshold ωth_2, and the slip angle θslip is equal to or greater than the second threshold θth_2. Therefore, at the point of time t92, the first brake hydraulic pressure starts to be increased, and the fuel injection amount starts to be decreased. Thereby, the slip angle θslip and the slip angle rate ωslip start to decrease. When (i) the slip angle θslip becomes smaller than the second threshold θth_2, and (ii) the slip angle rate ωslip becomes smaller than the second threshold ωth_2 at a point of time t93, the first brake hydraulic pressure starts to be decreased, and the fuel injection amount starts to be increased toward the target fuel injection amount Qtgt. Thereby, the slip angle θslip and the slip angle rate ωslip start to increase.

Thereafter, similarly, the first brake hydraulic pressure starts to be increased, and the fuel injection amount starts to be decreased at a point of time when (i) the slip angle θslip has reached the second threshold θth_2, and (ii) the slip angle rate ωslip had reached the second threshold ωth_2 (see points of time t94, t96, and t98). In addition, the first brake hydraulic pressure starts to be decreased, and the fuel injection amount starts to be increased at a point of time when (i) the slip angle θslip becomes smaller than the second threshold θth_2, or (ii) the slip angle rate ωslip becomes smaller than the second threshold ωth_2 (see points of time t95, t97, and t99).

The driver operates the steering wheel 43 to turn the vehicle 100 when the lane keep control is not executed, i.e., the normal steering control is executed. Thus, the driver may feel that the turn of the vehicle 100 does not fit the driver's operation to the steering wheel 43 and feel uneasy if the fuel injection amount is automatically decreased, and the brake hydraulic pressure is automatically increased before the lateral slip rate SL exceeds the lateral peak slip rate SLpeak.

In this embodiment, the first threshold θth_1 and the first threshold ωth_1 are set to values, respectively capable of preventing the driver from feeling uneasy as to the turn of the vehicle 100 due to automatically decreasing the fuel injection amount and automatically increasing the brake hydraulic pressure in response to the slip angle θslip having reached the first threshold θth_1 and the slip angle rate ωslip having reached the first threshold ωth_1. In addition, the first threshold θth_1 and the first threshold ωth_1 are set to the slip angle θslip and the slip angle rate ωslip, respectively corresponding to the lateral slip rate SL greater than the lateral peak slip rate SLpeak.

Therefore, the slip angle θslip reaches the first threshold θth_1, and the slip angle rate ωslip reaches the first threshold ωth_1 after the lateral slip rate SL exceeds the lateral peak slip rate SLpeak when the lane keep control is not executed. Thus, the fuel injection amount is automatically decreased, and the brake hydraulic pressure is automatically increased after the lateral slip rate SL exceeds the lateral peak slip rate SLpeak. Therefore, the driver can be prevented from feeling uneasy due to automatically decreasing the fuel injection amount and automatically increasing the brake hydraulic pressure.

On the other hand, the driver does not operate the steering wheel 43 for turning the vehicle 100 when the lane keep control is executed. Thus, the driver is unlikely to feel uneasy even if the fuel injection amount is automatically decreased, and the brake hydraulic pressure is automatically increased before the lateral slip rate SL exceeds the lateral peak slip rate SLpeak.

In this embodiment, the second threshold θth_2 and the second threshold ωth_2 are set to the slip angle θslip and the slip angle rate ωslip, respectively capable of controlling the average of the lateral slip rates SL of each of the left and right rear wheels 53 and 54 to the lateral peak slip rate SLpeak by (i) decreasing the fuel injection amount and increasing the brake hydraulic pressure in response to the slip angle θslip having reached the second threshold θth_2, and the slip angle rate ωslip having reached the second threshold θth_2, and (ii) increasing the fuel injection amount and decreasing the brake hydraulic pressure in response to the slip angle θslip becoming smaller than the second threshold θth_2, or the slip angle rate ωslip becoming smaller than the second threshold ωth_2. In addition, the second threshold θth_2 and the second threshold ωth_2 are set to the slip angle θslip and the slip angle rate ωslip, respectively corresponding to the lateral slip rate SL smaller than and near the lateral peak slip rate SLpeak.

Therefore, the average of the lateral slip rates SL of each of the left and right rear wheels 53 and 54 may be controlled to the lateral peak slip rate SLpeak when the lane keep control is executed. Thus, the vehicle 100 can be turned appropriately with preventing the driver from feeling uneasy due to automatically changing fuel injection amount and the brake hydraulic pressure.

<Vehicle Behavior Control, Normal Steering Control, and Understeer>

Further, the embodiment control apparatus executes the vehicle behavior control as follows when (i) the embodiment control apparatus does not execute the lane keep control, i.e., executes the normal steering control, (ii) the expected yaw rate difference Δδexp is a positive value, and (iii) an absolute value of the expected yaw rate difference Δδexp becomes equal to or greater than a predetermined threshold Δδth_1. Hereinafter, the predetermined threshold Δδth_1 will be referred to as "the first threshold Δδth_1".

The first threshold Δδth_1 is set to a value capable of preventing the driver from feeling uneasy as to the turn of the vehicle 100 due to automatically decreasing the fuel injection amount and automatically increasing the brake hydraulic pressure in response to the absolute value of the positive expected yaw rate difference Δδexp reaching the first threshold Δδth_1. In this embodiment, the first threshold Δδth_1 is set to the expected yaw rate difference Δδexp corresponding to the lateral slip rate SL greater than the lateral peak slip rate SLpeak. In particular, the first threshold Δδth_1 is set to the expected yaw rate difference Δδexp corresponding to the lateral slip rate SL greater than and near the lateral peak slip rate SLpeak. In this embodiment, a difference ΔSL_3 between (i) the lateral slip rate SL corresponding to the first threshold Δδth_1 and (i) the lateral peak slip rate SLpeak is relatively small.

The embodiment control apparatus determines that the lateral slip rates SL of the left and right front vehicle wheels 51 and 52 are large when (i) the embodiment control apparatus executes the normal steering control, (ii) the expected yaw rate difference Δδexp is the positive value, and (iii) the absolute value of the expected yaw rate difference Δδexp becomes equal to or greater than the first threshold Δδth_1. In this case, the embodiment control apparatus executes the vehicle behavior control to (i) apply the brake hydraulic pressure to the friction brake mechanism 21 provided to the rear vehicle wheel 53 or 54 located inwardly relative to the turn direction of the vehicle 100 and (ii) decreases the fuel injection amount. Hereinafter, the rear vehicle wheel 53 or 54 located inwardly relative to the turn direction of the vehicle 100 in this example will be also referred to as "the target vehicle wheel 50", and the friction brake mechanism 21 provided to the target vehicle wheel 50 in this example will be also referred to as "the target friction brake mechanism 21".

Thereby, the lateral slip rates SL of the left and right front vehicle wheels 51 and 52 are reduced. As a result, the absolute value of the positive expected yaw rate difference Δδexp decreases.

The embodiment control apparatus continues to increase the brake hydraulic pressure applied to the target friction brake mechanism 21 and continues to decrease the fuel injection amount until (i) the expected yaw rate difference Δδexp becomes a negative value, or (ii) the absolute value of the positive expected yaw rate difference Δδexp becomes smaller than the first threshold Δδth_1.

The embodiment control apparatus stops applying the brake hydraulic pressure to the target friction brake mechanism 21 and starts to increase the fuel injection amount toward the target fuel injection amount Qtgt when (i) the expected yaw rate difference Δδexp becomes the negative value, or (ii) the absolute value of the positive expected yaw rate difference Δδexp becomes smaller than the first threshold Δδth_1. Thereby, the embodiment control apparatus terminates the execution of the vehicle behavior control.

Figure 10:
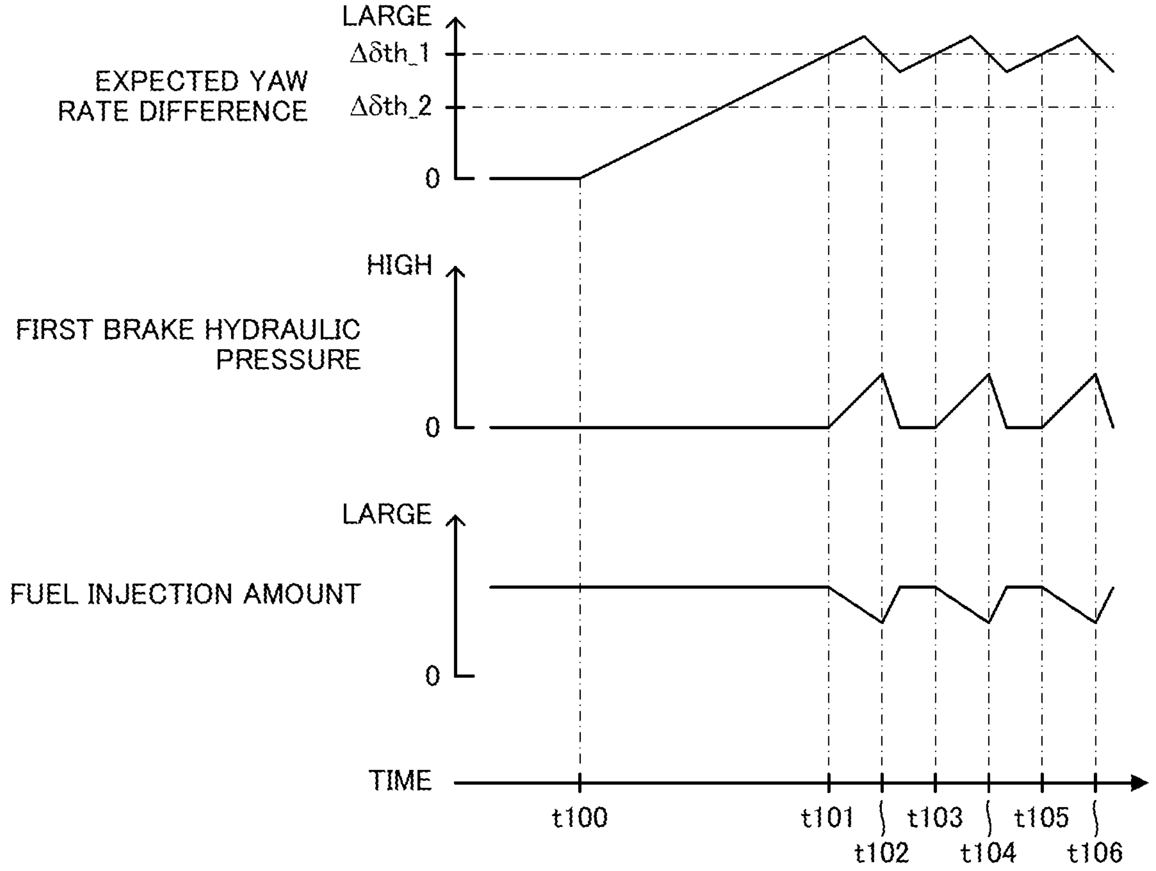
FIG. 10 is a view for showing a time chart used for describing the vehicle stability control during the execution of the normal acceleration-and-deceleration control.

For example, the brake hydraulic pressure, etc. are controlled as shown in FIG. 10 when the vehicle behavior control is executed as described above. In an example shown in FIG. 10, the target vehicle wheel 50 is the left front vehicle wheel 51. At a point of time t100 while the vehicle 100 turns, the absolute value of the positive expected yaw rate difference Δδexp start to increase. At a point of time t101, the absolute value of the positive expected yaw rate difference Δδexp reaches the first threshold Δδth_1.

When the absolute value of the positive expected yaw rate difference Δδexp reaches the first threshold Δδth_1 at the point of time t101, the first brake hydraulic pressure starts to be increased, and the fuel injection amount starts to be decreased. Thereby, the absolute value of the positive expected yaw rate difference Δδexp starts to decrease. When the absolute value of the positive expected yaw rate difference Δδexp becomes smaller than the first threshold Δδth_1 at a point of time t102, the first brake hydraulic pressure starts to be decreased, and the fuel injection amount starts to be increased toward the target fuel injection amount Qtgt. Thereby, the absolute value of the positive expected yaw rate difference Δδexp starts to increase.

Thereafter, similarly, the first brake hydraulic pressure starts to be increased, and the fuel injection amount starts to be decreased at a point of time when the absolute value of the positive expected yaw rate difference Δδexp reaches the first threshold Δδth_1 (see points of time t103 and t105). In addition, the first brake hydraulic pressure starts to be decreased, and the fuel injection amount starts to be increased at a point of time when (i) the expected yaw rate difference Δδexp becomes the negative value, or (ii) the absolute value of the positive expected yaw rate difference Δδexp becomes smaller than the first threshold Δδth_1 (see points of time t104 and t106).

<Vehicle Behavior Control, Lane Keep Control, and Understeer>

On the other hand, the embodiment control apparatus executes the vehicle behavior control as follows when (i) the embodiment control apparatus executes the lane keep control, (ii) the expected yaw rate difference Δδexp is the positive, and (iii) the absolute value of the expected yaw rate difference Δδexp becomes equal to or greater than a predetermined threshold Δδth_2. Hereinafter, the predetermined threshold Δδ_2 will be referred to as "the second threshold Δδth_2". The second threshold Δδth_2 is set to a value smaller than the first threshold Δδth_1.

The second threshold Δδth_2 is set to the expected yaw rate difference Δδexp capable of controlling the average of the lateral slip rates SL of each of the left and right front wheels 51 and 52 to the lateral peak slip rate SLpeak by (i) decreasing the fuel injection amount and increasing the brake hydraulic pressure in response to the absolute value of the positive expected yaw rate difference Δδexp reaching the second threshold Δδth_2, and (ii) increasing the fuel injection amount and decreasing the brake hydraulic pressure in response to the absolute value of the positive expected yaw rate difference Δδexp becoming smaller than the second threshold Δδth_2. In this embodiment, the second threshold Δδth_2 is set to the expected yaw rate difference Δδexp corresponding to the lateral slip rate SL smaller than the lateral peak slip rate SLpeak. In particular, the second threshold Δδth_2 is set to the expected yaw rate difference Δδexp corresponding to the lateral slip rate SL smaller than and near the lateral peak slip rate SLpeak. In this embodiment, a difference ΔSL_4 between (i) the lateral slip rate SL corresponding to the second threshold Δδth_2 and (ii) the lateral peak slip rate SLpeak is relatively small.

The embodiment control apparatus determines that the lateral slip rates SL of the left and right front vehicle wheels 51 and 52 are large when (i) the embodiment control apparatus executes the lane keep control, (ii) the expected yaw rate difference Δδexp is the positive, and (iii) the absolute value of the expected yaw rate difference Δδexp becomes equal to or greater than the second threshold Δδth_2. In this case, the embodiment control apparatus executes the vehicle behavior control to (i) apply the brake hydraulic pressure to the friction brake mechanism 21 provided to the rear vehicle wheel 53 or 54 located inwardly relative to the turn direction of the vehicle 100 and (ii) decreases the fuel injection amount. Hereinafter; the rear vehicle wheel 53 or 54 located inwardly relative to the turn direction of the vehicle 100 in this example will be also referred to as "the target vehicle wheel 50", and the friction brake mechanism 21 provided to the target vehicle wheel 50 in this example will be also referred to as "the target friction brake mechanism 21".

Thereby, the lateral slip rates SL of the left and right front vehicle wheels 51 and 52 are reduced. As a result, the absolute value of the positive expected yaw rate difference Δδexp decreases.

The embodiment control apparatus continues to increase the brake hydraulic pressure applied to the target friction brake mechanism 21 and continues to decrease the fuel injection amount until (i) the expected yaw rate difference Δδexp becomes the negative value, or (ii) the absolute value of the positive expected yaw rate difference Δδexp becomes smaller than the second threshold Δδth_2.

The embodiment control apparatus stops applying the brake hydraulic pressure to the target friction brake mechanism 21 and starts to increase the fuel injection amount toward the target fuel injection amount Qtgt when (i) the expected yaw rate difference Δδexp becomes the negative value or (ii) the absolute value of the positive expected yaw rate difference Δδexp becomes smaller than the second threshold Δδth_2. Thereby, the embodiment control apparatus terminates the execution of the vehicle behavior control.

Figure 11:
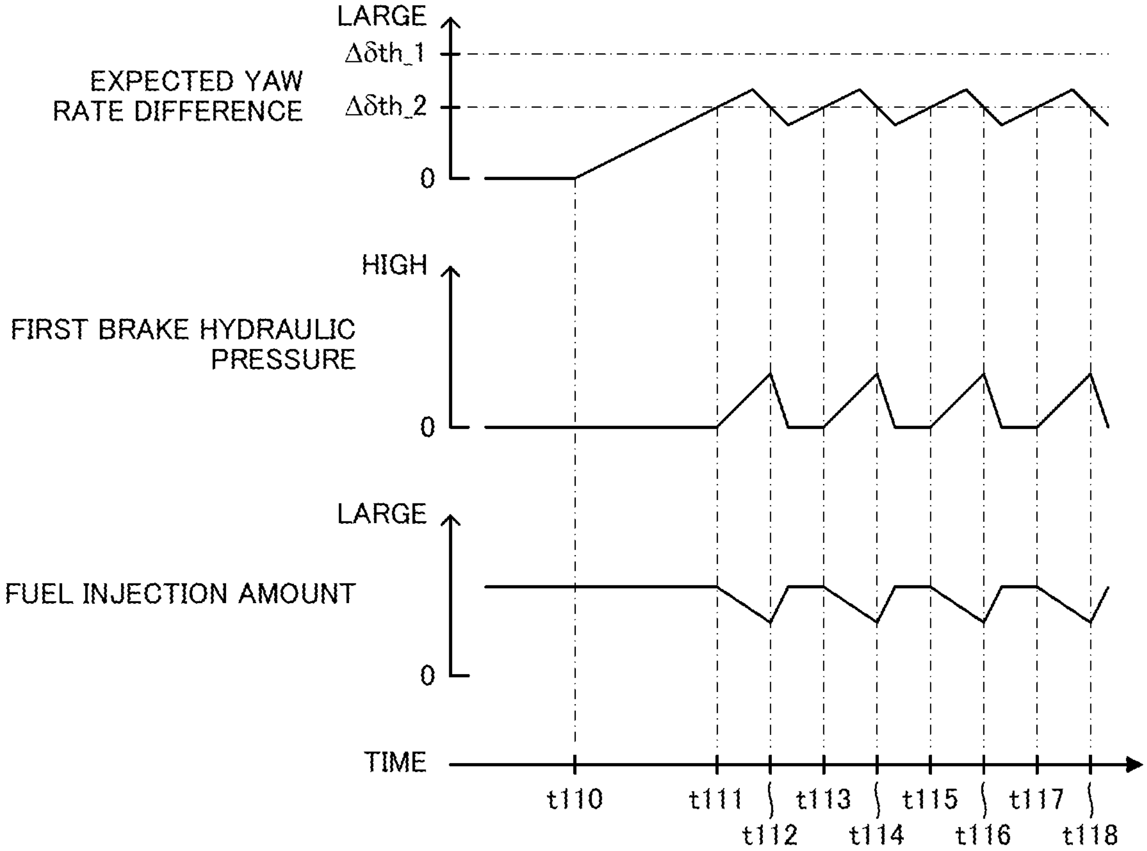
FIG. 11 is a view for showing a time chart used for describing the vehicle stability control during the execution of the lane keep control.

For example, the brake hydraulic pressure, etc. are controlled as shown in FIG. 11 when the vehicle behavior control is executed as described above. In an example shown in FIG. 11, the target vehicle wheel 50 is the left front vehicle wheel 51. At a point of time t110 while the vehicle 100 turns, the absolute value of the positive expected yaw rate difference Δδexp starts to increase. At a point of time t111, the absolute value of the positive expected yaw rate difference Δδexp reaches the second threshold Δδth_2.

When the absolute value of the positive expected yaw rate difference Δδexp reaches the second threshold Δδth_2 at the point of time t111, the first brake hydraulic pressure starts to be increased, and the fuel injection amount starts to be decreased. Thereby, the absolute value of the positive expected yaw rate difference Δδexp starts to decrease. When the absolute value of the positive expected yaw rate difference Δδexp becomes smaller than the second threshold Δδth_2 at a point of time t112, the first brake hydraulic pressure starts to be decreased, and the fuel injection amount starts to be increased toward the target fuel injection amount Qtgt. Thereby, the absolute value of the positive expected yaw rate difference Δδexp starts to increase.

Thereafter, similarly, the first brake hydraulic pressure starts to be increased, and the fuel injection amount starts to be decreased at a point of time when the absolute value of the positive expected yaw rate difference Δδexp reaches the second threshold Δδth_2 (see points of time t113, t115, and t117). In addition, the first brake hydraulic pressure starts to be decreased, and the fuel injection amount starts to be increased at a point of time when (i) the expected yaw rate difference Δδexp becomes the negative value, or (ii) the absolute value of the positive expected yaw rate difference Δδexp becomes smaller than the second threshold Δδth_2 (see points of time t114, t116, and t118).

The driver operates the steering wheel 43 to turn the vehicle 100 when the lane keep control is not executed, the normal steering control is executed. Thus, the driver feels that the turn of the vehicle 100 does not fit the driver's operation to the steering wheel 43 and feel uneasy if the fuel injection amount is automatically decreased, and the brake hydraulic pressure is automatically increased before the lateral slip rate SL exceeds the lateral peak slip rate SLpeak.

In this embodiment, the first threshold Δδth_1 is set to the expected yaw rate difference Δδexp capable of preventing the driver from feeling uneasy as to the turn of the vehicle 100 due to automatically decreasing the fuel injection amount and automatically increasing the brake hydraulic pressure in response to the absolute value of the positive expected yaw rate difference Δδexp reaching the first threshold Δδth_1. In addition, the first threshold Δδth_1 is set to the expected yaw rate difference Δδexp corresponding to the lateral slip rate SL greater than the lateral peak slip rate SLpeak.

Therefore, the absolute value of the positive expected yaw rate difference Δδexp reaches the first threshold Δδth_1 after the lateral slip rate SL exceeds the lateral peak slip rate SLpeak when the lane keep control is not executed. Thus, the fuel injection amount is automatically decreased, and the brake hydraulic pressure is automatically increased after the lateral slip rate SL exceeds the lateral peak slip rate SLpeak. Therefore, the driver can be prevented from feeling uneasy due to automatically decreasing the fuel injection amount and automatically increasing the brake hydraulic pressure.

On the other hand, the driver does not operate the steering wheel 43 for turning the vehicle 100 when the lane keep control is executed. Thus, the driver is unlikely to feel uneasy even if due to the fuel injection amount is automatically decreased, and the brake hydraulic pressure is automatically increased before the lateral slip rate SL exceeds the lateral peak slip rate SLpeak.

In this embodiment, the second threshold Δδth_2 is set to the expected yaw rate difference Δδexp capable of controlling the average of the lateral slip rates SL of each of the left and right front wheels 51 and 52 to the lateral peak slip rate SLpeak by (i) decreasing the fuel injection amount and increasing the brake hydraulic pressure in response to the absolute value of the positive expected yaw rate difference Δδexp reaching the second threshold Δδth_2 and (ii) increasing the fuel injection amount and decreasing the brake hydraulic pressure in response to the absolute value of the positive expected yaw rate difference Δδexp becoming smaller than the second threshold Δδth_2, or the expected yaw rate difference Δδexp becoming the negative value. In addition, the second threshold Δδth_2 is set to the expected yaw rate difference Δδexp corresponding to the lateral slip rate SL smaller than and near the lateral peak slip rate SLpeak.

Therefore, the average of the lateral slip rates SL of each of the left and right front wheels 51 and 52 may be controlled to the lateral peak slip rate SLpeak when the lane keep control is executed. Thus, the vehicle 100 can be turned appropriately with preventing the driver from feeling uneasy due to automatically changing fuel injection amount and the brake hydraulic pressure.

<Concrete Operation of Embodiment Apparatus>

Next, a concrete operation of the embodiment control apparatus will be described.

Figure 12:
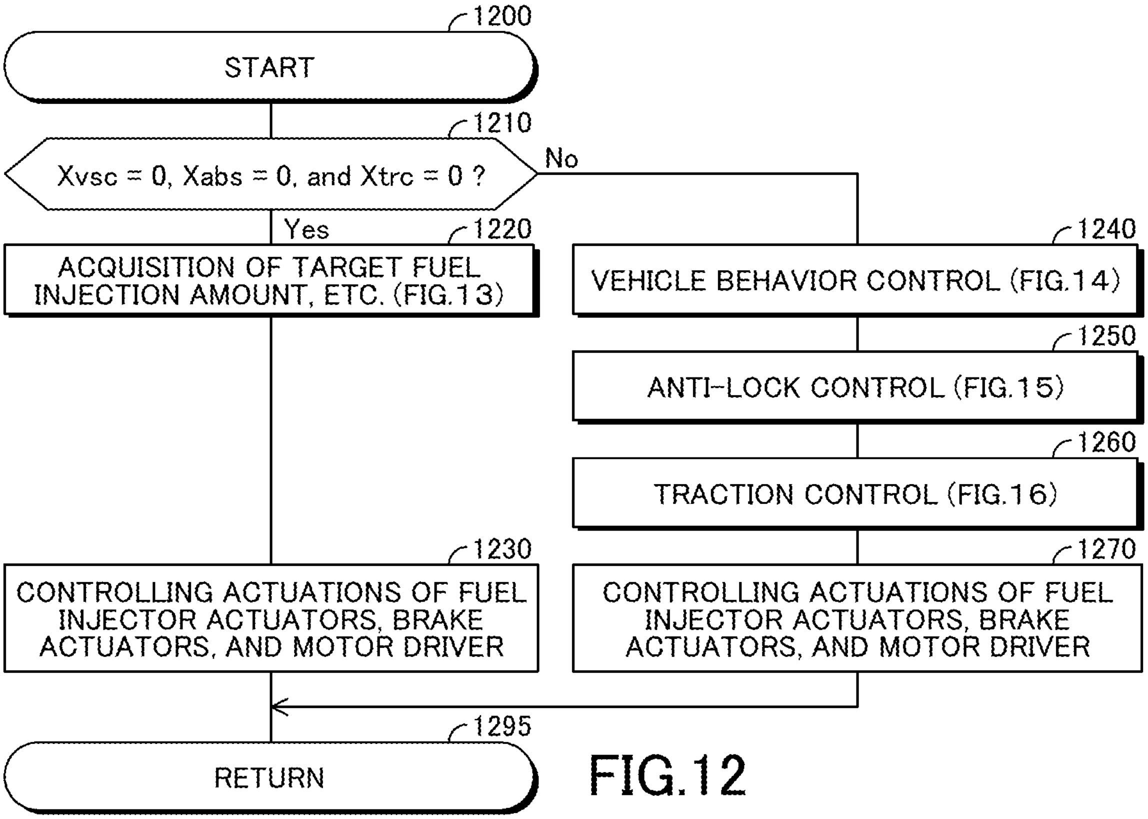
FIG. 12 is a view for showing a flowchart of a routine executed by a CPU of an ECU shown in FIG. 1.

The CPU of the ECU 90 of the embodiment control apparatus is configured or programmed to execute a routine shown by a flowchart in FIG. 12 each time a predetermined time elapses. Therefore, at a predetermined timing, the CPU starts a process from a step 1200 and then, proceeds with the process to a step 1210 to determine whether values of (i) a vehicle behavior control flag Xvsc, (ii) an anti-lock control flag Xabs, and (iii) a traction control flag Xtrc are "0".

The vehicle behavior control flag Xvsc represents whether the vehicle behavior control is executed. The vehicle behavior control flag Xvsc represents that the vehicle behavior control is executed when the value of the vehicle behavior control flag Xvsc is "1". On the other hand, the vehicle behavior control flag Xvsc represents that the vehicle behavior control is not executed when the value of the vehicle behavior control flag Xvsc is "0". The anti-lock control flag Xabs represents whether the anti-lock control is executed. The anti-lock control flag Xabs represents that the anti-lock control is executed when the value of the anti-lock control flag Xabs is "1". On the other hand, the anti-lock control flag Xabs represents that the anti-lock control is not executed when the value of the anti-lock control flag Xabs is "0". The traction control flag Xtrc represents whether the traction control is executed. The traction control flag Xtrc represents that the traction control is executed when the value of the traction control flag Xtrc is "1". On the other hand, the traction control flag Xtrc represents that the traction control is not executed when the value of the traction control flag Xtrc is "0".

Figure 13:
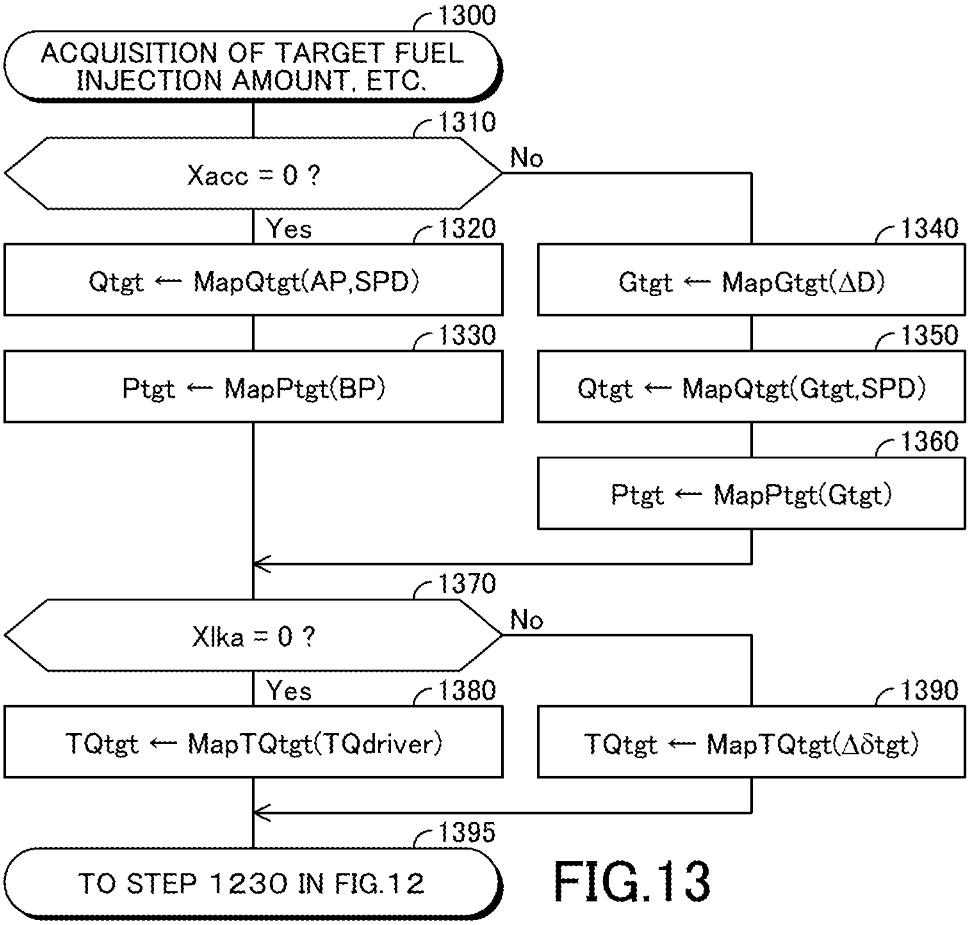
FIG. 13 is a view for showing a flowchart of a routine executed by the CPU.

When the values of (i) the vehicle behavior control flag Xvsc, (ii) the anti-lock control flag Xabs, and (iii) the traction control flag Xtrc are "0", the CPU determines "Yes" at the step 1210 and then, proceeds with the process to a step 1220 to execute a routine shown by a flowchart in FIG. 13.

Therefore, when the CPU proceeds with the process to the step 1220, the CPU starts a process from a step 1300 in FIG. 13 and then, proceeds with the process to a step 1310 to determine whether a value of an inter-vehicle distance control flag Xacc is "0".

The inter-vehicle distance control flag Xacc represents whether the execution of the inter-vehicle distance control is requested. The inter-vehicle distance control flag Xacc represents that the execution of the inter-vehicle distance control is requested when the value of the inter-vehicle distance control flag Xacc is "1". On the other hand, the inter-vehicle distance control flag Xacc represents that the execution of the inter-vehicle distance control is not requested when the value of the inter-vehicle distance control flag Xacc is "0".

When the value of the inter-vehicle distance control flag Xacc is "0", the CPU determines "Yes" at the step 1310 and then, sequentially executes processes of steps 1320 and 1330 described below. Then, the CPU proceeds with the process to a step 1370.

Step 1320: The CPU applies the acceleration pedal operation amount AP and the vehicle movement speed SPD to a look-up table MapQtgt(AP,SPD) to acquire the target fuel injection amount Qtgt. The target fuel injection amount Qtgt acquired from the look-up table MapQtgt(AP,SPD) is greater than zero and increases as the acceleration pedal operation amount AP increases when the acceleration pedal operation amount AP is greater than zero. In addition, the target fuel injection amount Qtgt acquired from the look-up table MapQtgt(AP,SPD) is greater than zero and increases as the vehicle movement speed SPD increases when the acceleration pedal operation amount AP is greater than zero. On the other hand, the target fuel injection amount Qtgt acquired from the look-up table MapQtgt(AP,SPD) is zero, independently of the vehicle movement speed SPD when the acceleration pedal operation amount AP is zero.

Step 1330: The CPU applies the brake pedal operation amount BP to a look-up table MapPtgt(BP) to acquire the target brake hydraulic pressure Ptgt. The target brake hydraulic pressure Ptgt acquired from the look-up table MapPtgt(BP) is greater than zero and increases as the brake pedal operation amount BP increases when the brake pedal operation amount BP is greater than zero. On the other hand, the target brake hydraulic pressure Ptgt acquired from the look-up table MapPtgt(BP) is zero when the brake pedal operation amount BP is zero.

When the value of the inter-vehicle distance control flag Xacc is "1", the CPU determines "No" at the step 1310 and then, sequentially executes processes of steps 1340 to 1360 described below. Then, the CPU proceeds with the process to the step 1370.

Step 1340: The CPU applies the inter-vehicle distance difference ΔD to a look-up table MapGtgt(ΔD) to acquire the target acceleration Gtgt. The target acceleration Gtgt acquired from the look-up table MapGtgt(ΔD) is greater than zero and increases as the inter-vehicle distance difference ΔD increases when the inter-vehicle distance difference ΔD is greater than zero. On the other hand, the target acceleration Gtgt acquired from the look-up table MapGtgt (ΔD) is smaller than zero, and an absolute value of the target acceleration Gtgt increases as an absolute value of the inter-vehicle distance difference ΔD increases when the inter-vehicle distance difference ΔD is smaller than zero. Further the target acceleration Gtgt acquired from the look-up table MapGtgt(ΔD) is zero when the inter-vehicle distance difference ΔD is zero.

Step 1350: The CPU acquires the target acceleration Gtgt and the vehicle movement speed SPD to a look-up table MapQtgt(Gtgt,SPD) to acquire the target fuel injection amount Qtgt. The target fuel injection amount Qtgt acquired from the look-up table MapQtgt(Gtgt,SPD) is greater than zero and increases as the target acceleration Gtgt increases when the target acceleration Gtgt is greater than zero. In addition, the target fuel injection amount Qtgt acquired from the look-up table MapQtgt(Gtgt,SPD) is greater than zero and increases as the vehicle movement speed SPD increases when the target acceleration Gtgt is greater than zero. On the other hand, the target fuel injection amount Qtgt acquired from the look-up table MapQtgt(Gtgt,SPD) is zero, independently of the vehicle movement speed SPD when the target acceleration Gtgt is zero.

Step 1360: The CPU applies the target acceleration Gtgt to a look-up table MapPtgt(Gtgt) to acquire the target brake hydraulic pressure Ptgt. The target brake hydraulic pressure Ptgt acquired from the look-up table MapPtgt(Gtgt) is greater than zero and increases as the absolute value of the target acceleration Gtgt increases when the target acceleration Gtgt is smaller than zero. On the other hand, the target brake hydraulic pressure Ptgt acquired from the look-up table MapPtgt(Gtgt) is zero when the target acceleration Gtgt is equal to or greater than zero.

When the CPU proceeds with the process to the step 1370, the CPU determines whether a value of a lane keep control flag Xlka is "0".

The lane keep control flag Xlka represents whether the execution of the lane keep control is requested. The lane keep control flag Xlka represents that the execution of the lane keep control is requested when the value of the lane keep control flag Xlka is "1". On the other hand, the lane keep control flag Xlka represents that the execution of the lane keep control is not requested when the value of the lane keep control flag Xlka is "0".

When the value of the lane keep control flag Xlka is "0", the CPU determines "Yes" at the step 1370 and then, executes a process of a step 1380 described below. Then, the CPU proceeds with the process to a step 1230 in FIG. 12 via a step 1395.

Step 1380: The CPU applies the driver steering torque TQdriver to a look-up table MapTQtgt(TQdriver) to acquire the target steering torque TQtgt. The target steering torque TQtgt acquired from the look-up table MapTQtgt(TQdriver) is greater than zero and increases as the driver steering torque TQdriver increases when the driver steering torque TQdriver is greater than zero. On the other hand, the target steering torque TQtgt acquired from the look-up table MapTQtgt(TQdriver) is smaller than zero, and an absolute value of the target steering torque TQtgt increases as an absolute value of the driver steering torque TQdriver increases when the driver steering torque TQdriver is smaller than zero. Further, the target steering torque TQtgt acquired from the look-up table MapTQtgt(TQdriver) is zero when the driver steering torque TQdriver is zero.

When the value of the lane keep control flag Xlka is "1", the CPU determines "No" at the step 1370 and then, executes a process of a step 1390 described below. Then, the CPU proceeds with the process to the step 1230 in FIG. 12 via the step 1395.

Step 1390: The CPU applies a difference Δδtgt between the target yaw rate δtgt and the actual yaw rate δ to a look-up table MapTQtgt(Δδtgt) to acquire the target steering torque TQtgt. Hereinafter, the difference Δδtgt will be referred to as "the target yaw rate difference Δδtgt". The target steering torque TQtgt acquired from the look-up table MapTQtgt (Δδtgt) is greater than zero and increases as the target yaw rate difference Δδtgt increases when the target yaw rate difference Δδtgt is greater than zero. On the other hand, the target steering torque TQtgt acquired from the look-up table MapTQtgt(Δδtgt) is smaller than zero, and an absolute value of the target steering torque TQtgt increases as an absolute value of the target yaw rate difference Δδtgt increases when the target yaw rate difference Δδtgt is smaller than zero. Further, the target steering torque TQtgt acquired from the look-up table MapTQtgt(Δδtgt) is zero when the target yaw rate difference Δδtgt is zero.

When the CPU proceeds with the process to the step 1230 in FIG. 12, the CPU controls the activations of the fuel injector actuators 12 such that the fuel having the target fuel injection amount Qtgt acquired by the routine shown in FIG. 13 is injected from each fuel injector 11. Further, the CPU controls the activations of the brake actuators 22 such that the brake hydraulic pressure corresponding to the target brake hydraulic pressure Ptgt acquired by the routine shown in FIG. 13 is applied to the friction brake mechanisms 21. Furthermore, the CPU controls the activation of the motor driver 31 such that the torque corresponding to the target steering torque TQtgt acquired by the routine shown in FIG. 13 is applied to the steering shaft 44. Then, the CPU proceeds with the process to a step 1295 to terminate this routine once.

Figure 14:
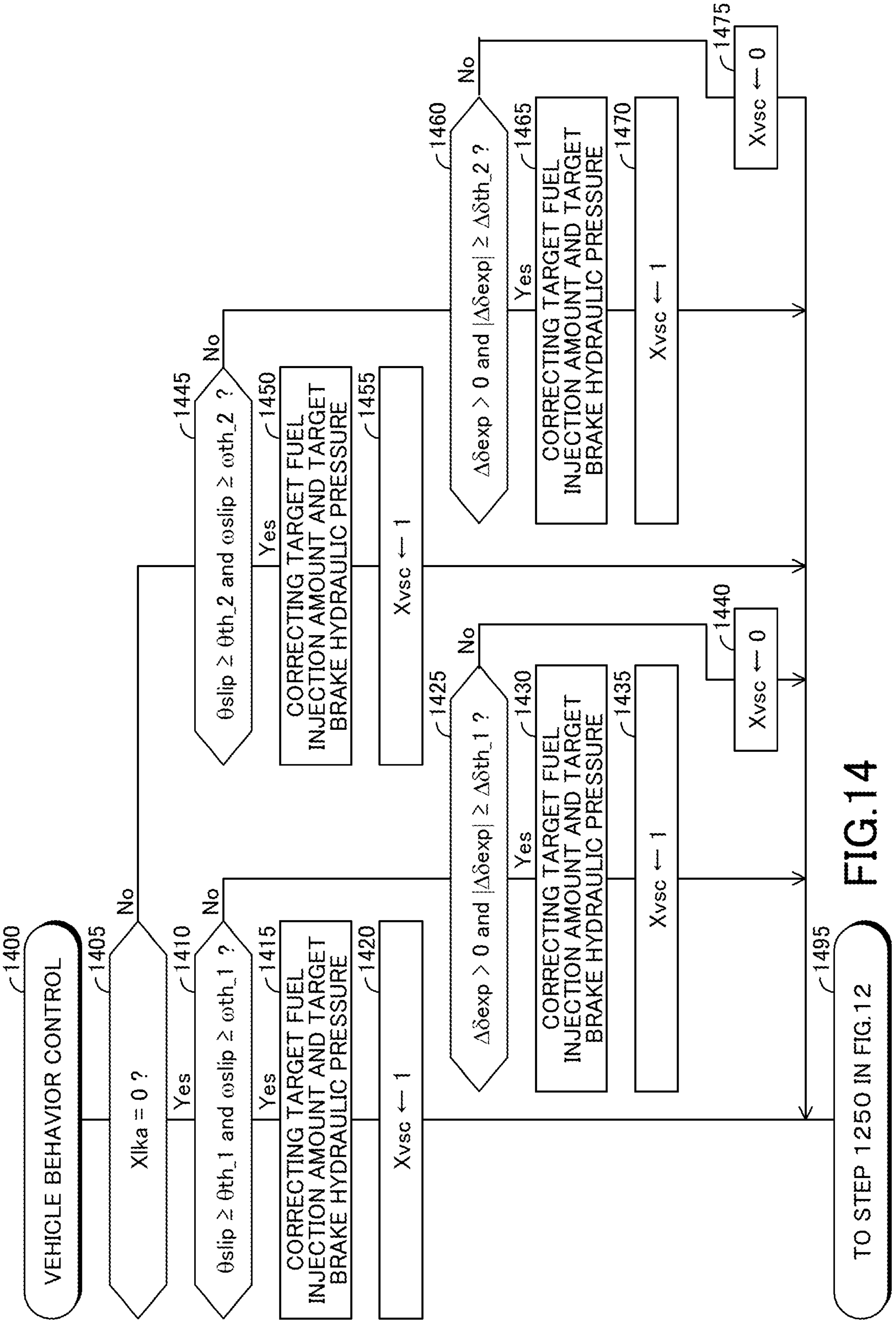
FIG. 14 is a view for showing a flowchart of a routine executed by the CPU.

When any of the values of (i) the vehicle behavior control flag Xvsc, (ii) the anti-lock control flag Xabs, and (iii) the traction control flag Xtrc is "1" at a time of executing a process of the step 1210, the CPU determines "No" at the step 1210 and then, proceeds with the process to a step 1240 to execute a routine shown by a flowchart in FIG. 14.

Therefore, when the CPU proceeds with the process to the step 1240, the CPU starts a process from a step 1400 in FIG. 14 and then, proceeds with the process to a step 1405 to determine whether the value of the lane keep control flag Xlka is "0".

When the value of the lane keep control flag Xlka is "0", the CPU determines "Yes" at the step 1405 and then, proceeds with the process to a step 1410 to determine whether (i) the slip angle θslip is equal to or greater than the first threshold θth_1, and (ii) the slip angle rate ωslip is equal to or greater than the first threshold ωth_1.

When (i) the slip angle θslip is equal to or greater than the first threshold θth_1, and (ii) the slip angle rate ωslip is equal to or greater than the first threshold ωth_1, the CPU determines "Yes" at the step 1410 and then, sequentially executes processes of steps 1415 and 1420 described below. Then, the CPU proceeds with the process to a step 1250 in FIG. 12 via a step 1495.

Step 1415: The CPU sets the target fuel injection amount Qtgt to an amount acquired by subtracting a predetermined amount ΔQover from the currently-set target fuel injection amount Qtgt. In other words, the CPU corrects the currently-set target fuel injection amount Qtgt to decrease the currently-set target fuel injection amount Qtgt by the predetermined amount ΔQover. In addition, the CPU sets the target brake hydraulic pressure Ptgt for the target vehicle wheel 50 to a value acquired by adding a predetermined value ΔPover to the currently-set target brake hydraulic pressure Ptgt for the target vehicle wheel 50. In other words, the CPU corrects the currently-set target brake hydraulic pressure Ptgt for the target vehicle wheel 50 to increase the currently-set target brake hydraulic pressure Ptgt for the target vehicle wheel 50 by the predetermined value ΔPover.

Step 1420: The CPU sets the value of the vehicle behavior control flag Xvsc to "1".

On the other hand, when (i) the slip angle θslip is smaller than the first threshold θth_1, or (ii) the slip angle rate ωslip is smaller than the first threshold ωth_1, the CPU determines "No" at the step 1410 and then, proceeds with the process to a step 1425 to determine whether (i) the expected yaw rate difference Δδexp is the positive value, and (ii) the absolute value of the expected yaw rate difference Δδexp is equal to or greater than the first threshold Δδth_1.

When (i) the expected yaw rate difference Δδexp is the positive value, and (ii) the absolute value of the expected yaw rate difference Δδexp is equal to or greater than the first threshold Δδth_1, the CPU determines "Yes" at the step 1425 and then, sequentially executes processes of steps 1430 and 1435 described below. Then, the CPU proceeds with the process to the step 1250 in FIG. 12 via the step 1495.

Step 1430: The CPU sets the target fuel injection amount Qtgt to an amount acquired by subtracting a predetermined amount ΔQunder from the currently-set target fuel injection amount Qtgt. In other words, the CPU corrects the currently-set target fuel injection amount Qtgt to decrease the currently-set target fuel injection amount Qtgt by the predetermined amount ΔQunder. In addition, the CPU sets the target brake hydraulic pressure Ptgt for the target vehicle wheel 50 to a value acquired by adding a predetermined value ΔPunder to the currently-set target brake hydraulic pressure Ptgt for the target vehicle wheel 50. In other words, the CPU corrects the target brake hydraulic pressure Ptgt for the target vehicle wheel 50 to increase the target brake hydraulic pressure Ptgt for the target vehicle wheel 50 by the predetermined value ΔPunder.

Step 1435: The CPU sets the value of the vehicle behavior control flag Xvsc to "1".

On the other hand, when (i) the expected yaw rate difference Δδexp is the negative value, or (ii) the absolute value of the expected yaw rate difference Δδexp is smaller than the first threshold Δδth_1, the CPU determines "No" at the step 1425 and then, executes a process of a step 1440 described below. Then, the CPU proceeds with the process to the step 1250 in FIG. 12 via the step 1495.

Step 1440: The CPU sets the value of the vehicle behavior control flag Xvsc to "0".

When the value of the lane keep control flag Xlka is "1" at a time of executing a process of the step 1405, the CPU determines "No" at the step 1405 and then, proceeds with the process to a step 1445 to determine whether (i) the slip angle θslip is equal to or greater than the second threshold θth_2, and (ii) the slip angle rate ωslip is equal to or greater than the second threshold ωth_2.

When (i) the slip angle θslip is equal to or greater than the second threshold θth_2, and (ii) the slip angle rate ωslip is equal to or greater than the second threshold ωth_2, the CPU determines "Yes" at the step 1445 and then, sequentially executes processes of steps 1450 and 1455 described below. Then, the CPU proceeds with the process to the step 1250 in FIG. 12 via the step 1495.

Step 1450: The CPU executes the same process as the process of the step 1415.

Step 1455: The CPU sets the value of the vehicle behavior control, flag Xvsc to "1".

On the other hand, when (i) the slip angle θslip is smaller than the second threshold θth_2, or (ii) the slip angle rate ωslip is smaller than the second threshold ωth_2, the CPU determines "No" at the step 1445 and then, proceeds with the process to a step 1460 to determine whether (i) the expected yaw rate difference Δδexp is the positive value, and (ii) the absolute value of the expected yaw rate difference Δδexp is equal to or greater than the second threshold Δδth_2.

When (i) the expected yaw rate difference Δδexp is the positive value, and (ii) the absolute value of the expected yaw rate difference Δδexp is equal to or greater than the second threshold Δδth_2, the CPU determines "Yes" at the step 1460 and then, sequentially executes processes of steps 1465 and 1470 described below. Then, the CPU proceeds with the process to the step 1250 in FIG. 12 via the step 1495.

Step 1465: The CPU executes the same process as the process of the step 1430.

Step 1470: The CPU sets the value of the vehicle behavior control flag Xvsc to "1".

On the other hand, when (i) the expected yaw rate difference Δδexp is the negative value, or (ii) the absolute value of the expected yaw rate difference Δδexp is smaller than the second threshold Δδth_2, the CPU determines "No" at the step 1460 and then, executes a process of a step 1475 described below. Then, the CPU proceeds with the process to the step 1250 in FIG. 12 via the step 1495.

Figure 15:
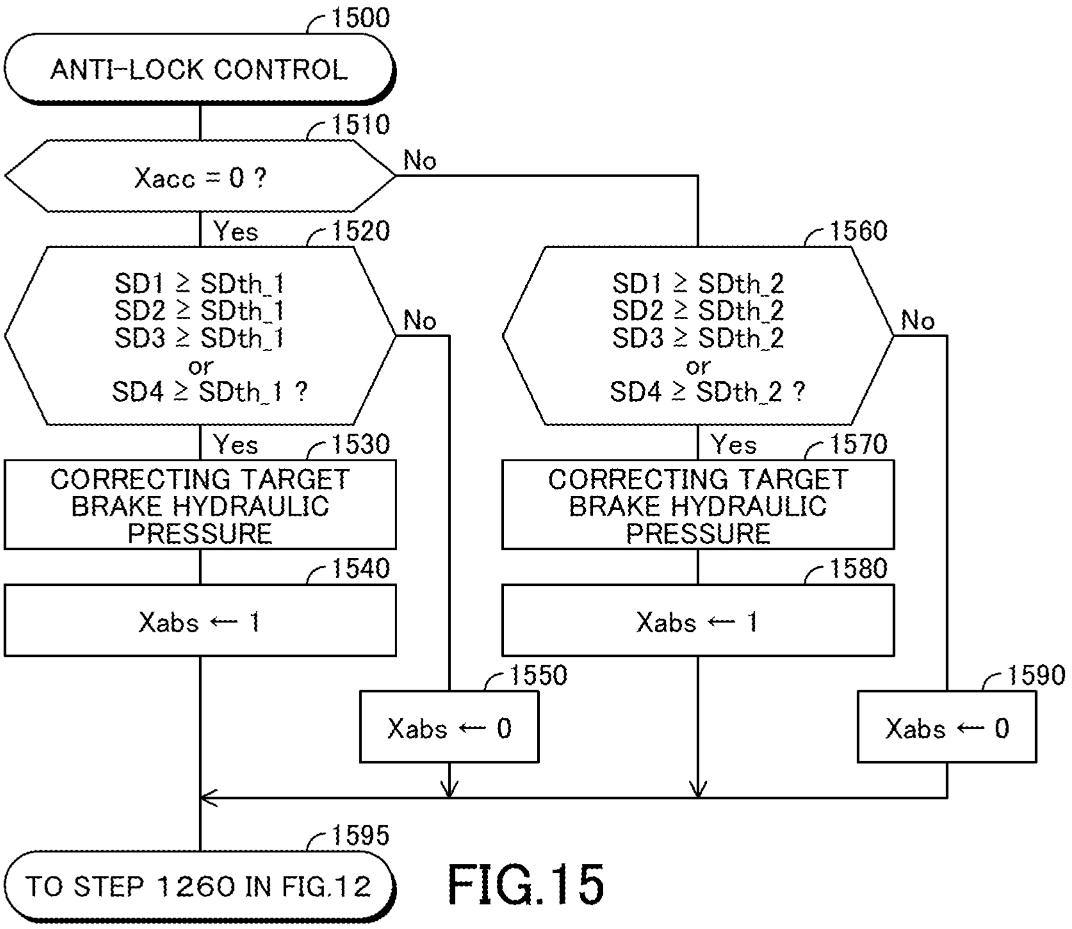
FIG. 15 is a view for showing a flowchart of a routine executed by the CPU.

When the CPU proceeds with the process to the step 1250 in FIG. 12, the CPU executes a routine shown by a flowchart in FIG. 15. Therefore, when the CPU proceeds with the process to the step 1250, the CPU starts a process from a step 1500 in FIG. 15 and then, proceeds with the process to a step 1510 to determine whether the value of the inter-vehicle distance control flag Xacc is "0".

When the value of the inter-vehicle distance control flag Xacc is "0", the CPU determines "Yes" at the step 1510 and then, proceeds with the process to a step 1520 to determine whether any of the first to fourth deceleration slip rates SD1 to SD4 is equal to or greater than the first threshold SDth_1.

When any of the first to fourth deceleration slip rates SD1 to SD4 is equal to or greater than the first threshold SDth_1, the CPU determines "Yes" at the step 1520 and then, sequentially executes processes of steps 1530 and 1540 described below. Then, the CPU proceeds with the process to a step 1260 in FIG. 12 via a step 1595.

Step 1530: The CPU sets the target brake hydraulic pressure Ptgt, for the target vehicle wheel 50 to a value acquired by subtracting a predetermined value ΔPde from the currently-set target brake hydraulic pressure Ptgt for the target vehicle wheel 50. In other words, the CPU corrects the target brake hydraulic pressure Ptgt for the target vehicle wheel 50 to increase the target brake hydraulic pressure Ptgt for the target vehicle wheel 50 by the predetermined value ΔPde.

Step 1540: The CPU sets the value of the anti-lock control flag Xabs to "1".

On the other hand, when the first to fourth deceleration slip rates SD1 to SD4 are smaller than the first threshold SDth_1, the CPU determines "No" at the step 1520 and then, executes a process of a step 1550 described below. Then, the CPU proceeds with the process to the step 1260 in FIG. 12 via the step 1595.

Step 1550: The CPU sets the value of the anti-lock control flag Xabs to "0".

When the value of the inter-vehicle distance control flag Xacc is "1" at a time of executing a process of the step 1510, the CPU determines "No" at the step 1510 and then, proceeds with the process to a step 1560 to determine whether any of the first to fourth deceleration slip rates SD1 to SD4 is equal to or greater than the second threshold SDth_2.

When any of the first to fourth deceleration slip rates SD1 to SD4 is equal to or greater than the second threshold SDth_2, the CPU determines "Yes" at the step 1560 and then, sequentially executes processes of steps 1570 and 1580 described below. Then, the CPU proceeds with the process to the step 1260 in FIG. 12 via the step 1595.

Step 1570: The CPU executes the same process as the process of the step 1530. In this case, the CPU corrects the currently-set target brake hydraulic pressure Ptgt for the target vehicle wheel 50.

Step 1580: The CPU sets the value of the anti-lock control flag Xabs to "1".

On the other hand, when the first to fourth deceleration slip rates SD1 to SD4 are smaller than the second threshold SDth_2, the CPU determines "No" at the step 1560 and then, executes a process of a step 1590 described below. Then, the CPU proceeds with the process to the step 1260 in FIG. 12 via the step 1595.

Step 1590: The CPU sets the value of the anti-lock control flag Xabs to "0".

Figure 16:
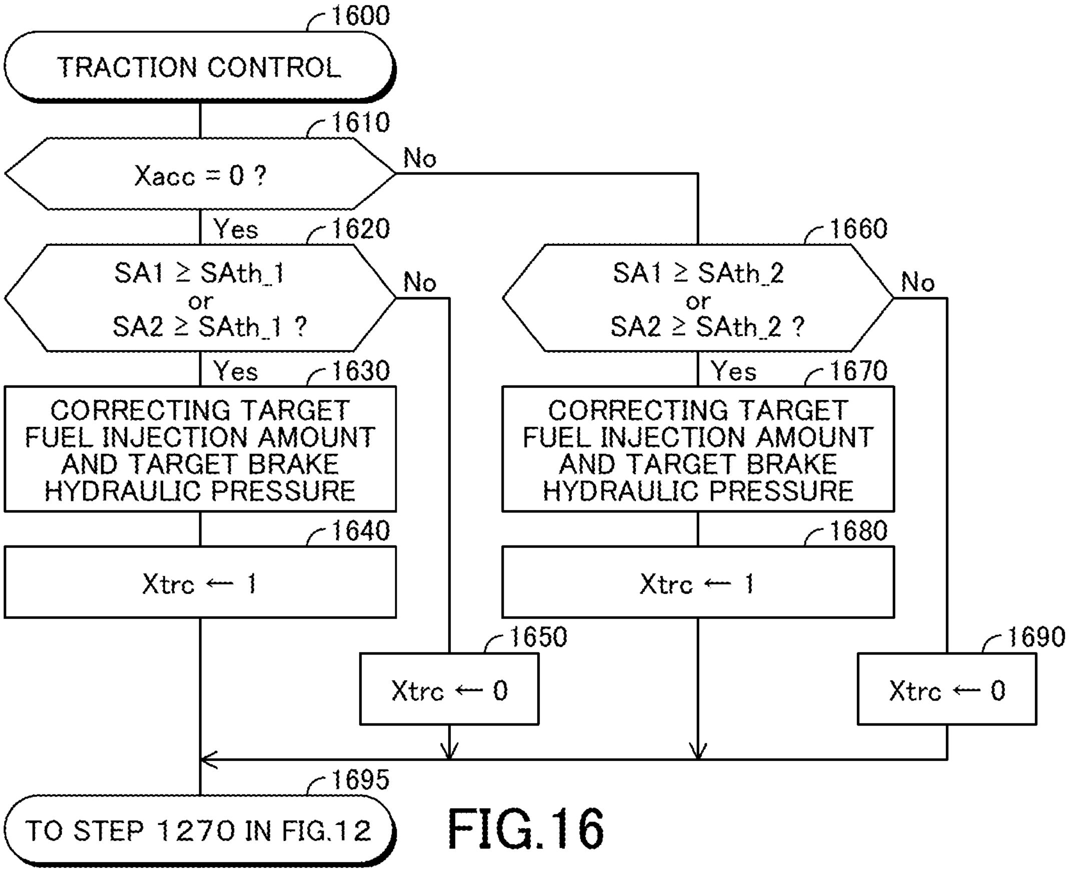
FIG. 16 is a view for showing a flowchart of a routine executed by the CPU.

When the CPU proceeds with the process to the step 1260 in FIG. 12, the CPU executes a routine shown by a flowchart in FIG. 16. Therefore, when the CPU proceeds with the process to the step 1260, the CPU starts a process from a step 1600 in FIG. 16 and then, proceeds with the process to a step 1610 to determine whether the value of the inter-vehicle distance control flag Xacc is "0".

When the value of the inter-vehicle distance control flag Xacc is "0", the CPU determines "Yes" at the step 1610 and then, proceeds with the process to a step 1620 to determine whether any of the first and second acceleration slip rates SA1 and SA2 is equal to or greater than the first threshold SAth_1.

When any of the first and second acceleration slip rates SA1 and SA2 is equal to or greater than the first threshold SAth_1, the CPU determines "Yes" at the step 1620 and then, sequentially executes processes of steps 1630 and 1640 described below. Then, the CPU proceeds with the process to a step 1270 in FIG. 12 via a step 1695.

Step 1630: The CPU sets the target fuel injection amount Qtgt to an amount acquired by subtracting a predetermined amount ΔQac from the currently-set target fuel injection amount Qtgt. In other words, the CPU corrects the currently-set target fuel injection amount Qtgt to decrease the currently-set target fuel injection amount Qtgt by the predetermined amount ΔQac. In addition, the CPU sets the target brake hydraulic pressure Ptgt for the target vehicle wheel 50 to a value acquired by adding a predetermined value ΔPac to the currently-set target brake hydraulic pressure Ptgt for the target vehicle wheel 50. In other words, the CPU corrects the currently-set target brake hydraulic pressure Ptgt for the target vehicle wheel 50 to increase the currently-set target brake hydraulic pressure Ptgt for the target vehicle wheel 50 by the predetermined value ΔPac.

Step 1640: The CPU sets the value of the traction control flag Xtrc to "1".

On the other hand, when the first and second acceleration slip rates SA1 and SA2 are smaller than the first threshold SAth_1, the CPU determines "No" at the step 1620 and then, executes a process of a step 1650 described below. Then, the CPU proceeds with the process to the step 1270 in FIG. 12 via the step 1695.

Step 1650: The CPU sets the value of the traction control flag Xtrc to "0".

When the value of the inter-vehicle distance control flag Xacc is "1" at a time of executing a process of the step 1610, the CPU determines "No" at the step 1610 and then, proceeds with the process to a step 1660 to determine whether any of the first and second acceleration slip rates SA1 and SA2 is equal to or greater than the second threshold SAth_2.

When any of the first and second acceleration slip rates SA1 and SA2 is equal to or greater than the second threshold SAth_2, the CPU determines "Yes" at the step 1660 and then, sequentially executes processes of steps 1670 and 1680 described below. Then, the CPU proceeds with the process to the step 1270 in FIG. 12 via the step 1695.

Step 1670: The CPU executes the same process as the process of the step 1630. In this case, the CPU corrects the currently-set target fuel injection amount Qtgt and the currently-set target brake hydraulic pressure Ptgt for the target vehicle wheel 50.

On the other hand, when the first and second acceleration slip rates SA1 and SA2 are smaller than the second threshold SAth_2, the CPU determines "No" at the step 1660 and then, executes a process of a step 1690 described below. Then, the CPU proceeds with the process to the step 1270 in FIG. 12 via the step 1695.

Step 1690: The CPU sets the value of the traction control flag Xtrc to "0".

When the CPU proceeds with the process to the step 1270 in FIG. 12, the CPU controls the activations of the fuel injector actuators 12 such that each fuel injector 11 injects the fuel having the currently-set target fuel injection amount Qtgt. Further, the CPU controls the activations of the brake actuators 22 such that the brake hydraulic pressure corresponding to the currently-set target brake hydraulic pressure Ptgt is applied to each friction brake mechanism 21. Furthermore, the CPU controls the activation of the motor driver 31 such that the torque corresponding to the currently-set TQtgt is applied to the steering shaft 44. Then, the CPU proceeds with the process to the step 1295 to terminate this routine once.

The concrete operation of the embodiment control apparatus has been described. When the embodiment control apparatus executes the routines shown in FIGS. 12 to 16, and the lane keep control and the inter-vehicle distance control as the driving assist control are not executed, the driver can be prevented from feeling uneasy (i) due to automatically decreasing the brake hydraulic pressure or (ii) due to automatically decreasing the fuel injection amount and automatically increasing the brake hydraulic pressure. In addition, the vehicle 100 can be braked or accelerated or turned appropriately with preventing the driver from feeling uneasy when any of the lane keep control and the inter-vehicle distance control is executed.

It should be noted that the present disclosure is not limited to the aforementioned embodiment and various modifications can be employed within the scope of the present disclosure.

<Braking Force Control Apparatus of Modified Example>

For example, the embodiment control apparatus executes the anti-lock control to the vehicle wheel 50 having the deceleration slip rate SD equal to or greater than the second threshold SDth_2 when any of the first to fourth deceleration slip rates SD1 to SD4 becomes equal to or greater than the second threshold SDth_2.

In this regard, the vehicle control apparatus including the vehicle braking force control apparatus according to a modified example of the embodiment of the disclosure executes the anti-lock control to the vehicle wheel 50 having (i) the deceleration slip rate SD equal to or greater than the second threshold SDth_2 and (ii) an increase rate dSD of the deceleration slip rate SD equal to or greater than a predetermined threshold dSDth when (i) any of the first to fourth deceleration slip rates SD1 to SD4 becomes equal to or greater than the second threshold SDth_2, and (ii) the increase rate dSD of the deceleration slip rate SD equal to or greater than the second threshold SDth_2 becomes equal to or greater than the predetermined threshold dSDth. Hereinafter, the vehicle control apparatus including the vehicle braking force control apparatus according to the modified example will be referred to as "the modified control apparatus".

In addition, the embodiment control apparatus executes the traction control to the vehicle wheel 50 having the acceleration slip rate SA equal to or greater than the second threshold SAth_2 when any of the first and second acceleration slip rates SA1 and SA2 becomes equal to or greater than the second threshold SAth_2.

In this regard, the modified control apparatus executes the traction control to the vehicle wheel 50 having (i) the acceleration slip rate SA equal to or greater than the second threshold SAth_2 and (ii) an increase rate dSA of the acceleration slip rate SA equal to or greater than a predetermined threshold dSAth when (i) any of the first and second deceleration slip rates SD1 and SD2 becomes equal to or greater than the second threshold SAth_2, and (ii) the increase rate dSA of the acceleration slip rate SA equal to or greater than the second threshold SAth_2 becomes equal to or greater than the predetermined threshold dSAth.

In addition, the embodiment control apparatus executes the vehicle behavior control when (i) the slip angle θslip becomes equal to or greater than the second threshold θth_2, and (ii) the slip angle rate θslip becomes equal to or greater than the second threshold ωth_2.

In this regard, the modified control apparatus executes the vehicle behavior when (i) the slip angle θslip becomes equal to or greater than the second threshold θth_2, (ii) the slip angle rate ωslip becomes equal to or greater than the second threshold ωth_2, (iii) an increase rate dθslip of the slip angle θslip becomes equal to or greater than a predetermined threshold dθth, and (iv) an increase rate dωslip of the slip angle rate ωslip becomes equal to or greater than a predetermined threshold dωth.

In addition, the embodiment control apparatus executes the vehicle behavior control in response to (i) the expected yaw rate difference Δδexp being the positive value, and (ii) the absolute value of the expected yaw rate difference Δδexp becoming equal to or greater than the second threshold Δδth_2.

In this regard, the modified control apparatus executes the vehicle behavior when (i) the expected yaw rate difference Δδexp being the positive value, (ii) the absolute value of the expected yaw rate difference Δδexp becomes equal to or greater than the second threshold Δδth_2, and (iii) an increase rate dΔδexp of the expected yaw rate difference Δδexp becomes equal to or greater than a predetermined threshold dΔδth.

If the execution of the anti-lock control is started in response to the deceleration slip rate SD reaching the second threshold SDth_2 when the increase rate dSD of the deceleration slip rate SD is relatively small, the deceleration slip rate SD may start to decrease before the deceleration slip rate SD exceeds the deceleration peak slip rate SDpeak. In this case, the average of the deceleration slip rates SD of the target vehicle wheel 50 may not be controlled to a value near the deceleration peak slip rate SDpeak.

According to the modified control apparatus, the execution of the anti-lock control is started in response to the deceleration slip rate SD reaching the second threshold SDth_2 at the relatively large increase rate dSD of the deceleration slip rate SD when the inter-vehicle distance control is executed. Therefore, the deceleration slip rate SD is likely to start to decrease when the deceleration slip rate SD slightly exceeds the deceleration peak slip rate SDpeak. Thus, the average value of the deceleration slip rates SD of the target vehicle wheel 50 is likely to be controlled to the value near the deceleration peak slip rate SDpeak when the execution of the anti-lock control is started while the vehicle 100 is braked by the inter-vehicle distance control.

Similarly, according to the modified control apparatus, the execution of the traction control is started in response to the acceleration slip rate SA reaching the second threshold SAth_2 at the relatively large increase rate dSA of the acceleration slip rate SA when the inter-vehicle distance control is executed. Therefore, the acceleration slip rate SA is likely to start to decrease when the acceleration slip rate SA slightly exceeds the acceleration peak slip rate SApeak. Thus, the average value of the acceleration slip rates SA of the target vehicle wheel 50 is likely to be controlled to the value near the acceleration peak slip rate SApeak when the execution of the traction control is started while the vehicle is braked by the inter-vehicle distance control.

Similarly, according to the modified control apparatus, the execution of the vehicle behavior control is started in response to (i) the slip angle θslip reaching the second threshold θth_2 at the relatively large increase rate dθslip of the slip angle θslip, and (ii) the slip angle rate ωslip reaching the second threshold ωth_2 at the relatively large increase rate dωslip of the slip angle rate ωslip when the lane keep control is executed. Therefore, the lateral slip rate SL becoming large is likely to start to decrease when the lateral slip rate SL in question slightly exceeds the lateral peak slip rate SLpeak. Thus, the average value of the lateral slip rates SL of the vehicle wheel 50 having the lateral slip rate SL once becoming large is likely to be controlled to a value near the lateral peak slip rate SLpeak when the execution of the vehicle behavior control is started while the vehicle 100 is turned by the lane keep control.

Similarly, according to the modified control apparatus, the execution of the vehicle behavior control is started in response to the expected yaw rate difference Δδexp reaching the second threshold Δδth_2 at the relatively large increase rate dΔδexp of the expected yaw rate difference Δδexp when the lane keep control is executed. Therefore, the lateral slip rate SL becoming large is likely to start to decrease when the lateral slip rate SL in question slightly exceeds the lateral peak slip rate SLpeak. Thus, the average value of the lateral slip rates SL of the vehicle wheel 50 having the lateral slip rate SL once becoming large is likely to be controlled to a value near the lateral peak slip rate SLpeak when the execution of the vehicle behavior control is started while the vehicle is turned by the lane keep control.

<Concrete Operation of Modified Apparatus>

Below, a concrete operation of the modified control apparatus will be described. The modified apparatus is configured or programmed to execute routines shown by flowcharts in FIGS. 17 to 19 in place of the routines shown in FIGS. 14 to 16.

In this case, when the CPU of the ECU 90 of the modified control apparatus proceeds with the process to the step 1220 in FIG. 12, the CPU executes the routine shown in FIG. 13. Further, when the CPU proceeds with the process to the step 1240 in FIG. 12, the CPU executes the routine shown in FIG. 17. Furthermore, when the CPU proceeds with the process to the step 1250 in FIG. 12, the CPU executes the routine shown in FIG. 18. Further, when the CPU proceeds with the process to the step 1260 in FIG. 12, the CPU executes the routine shown in FIG. 19.

Figure 17:
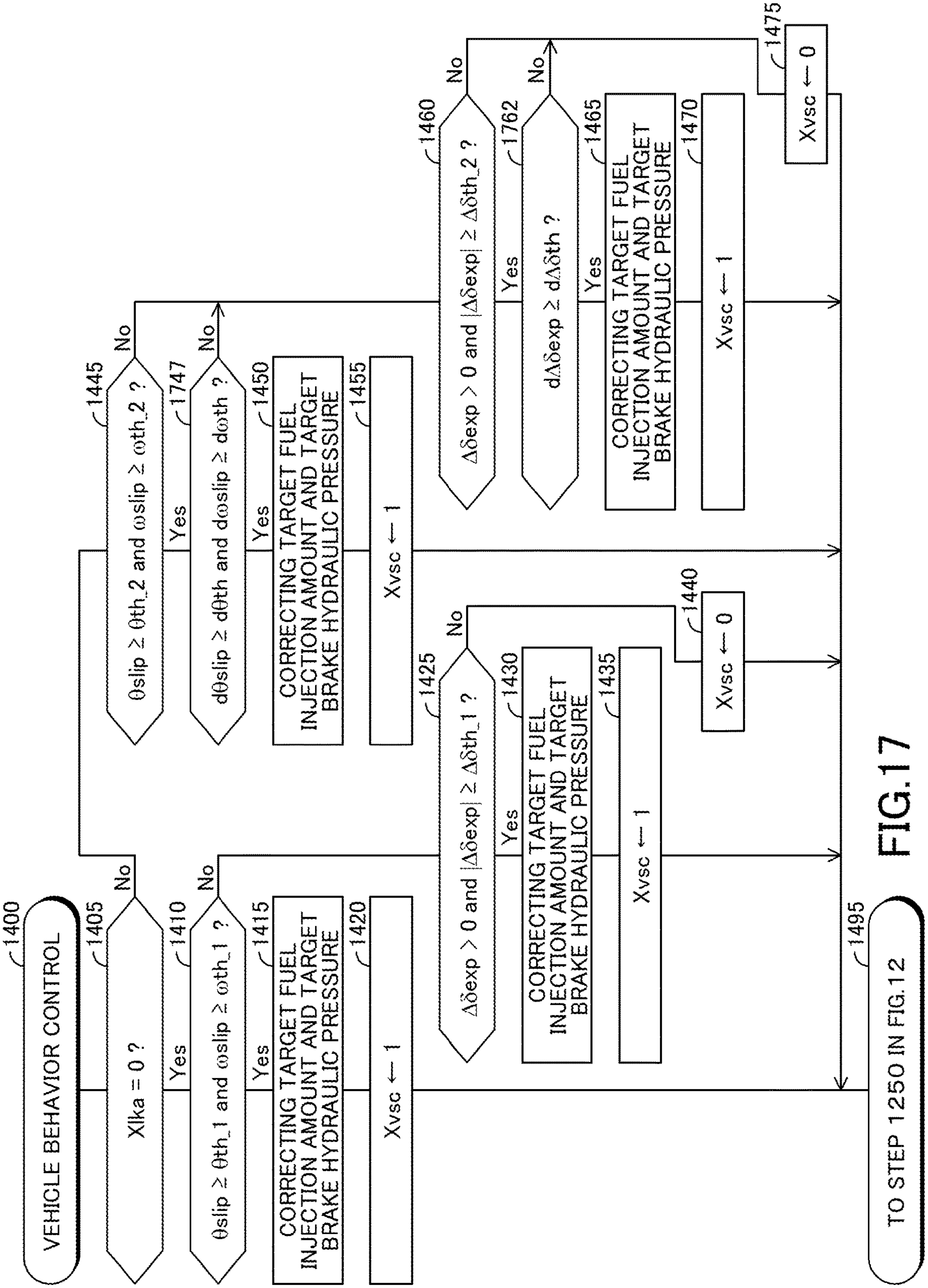
FIG. 17 is a view for showing a flowchart of a routine executed by the CPU.

The routine shown in FIG. 17 is the same as the routine shown in FIG. 14 except for steps 1747 and 1762. Therefore, when the CPU determines "Yes" at the step 1445, the CPU proceeds with the process to the step 1747 to determine whether (i) the increase rate dθslip of the slip angle θslip is equal to or greater than the predetermined threshold dθth, and (ii) the increase rate dωslip of the slip angle rate ωslip is equal to or greater than the predetermined threshold dωth.

When (i) the increase rate dθslip of the slip angle θslip is equal to or greater than the predetermined threshold dθth, and (ii) the increase rate dωslip of the slip angle rate ωslip is equal to or greater than the predetermined threshold dωth, the CPU determines "Yes" at the step 1747 and then, sequentially executes the processes of the steps 1450 and 1455.

On the other hand, when (i) the increase rate dθslip of the slip angle θslip is smaller than the predetermined threshold dθth, or (ii) the increase rate dωslip of the slip angle rate ωslip is smaller than the predetermined threshold dωth, the CPU determines "No" at the step 1747 and then, proceeds with the process to the step 1460.

Further, when the CPU determines "Yes" at the step 1460, the CPU proceeds with the process to the step 1762 to determine whether the increase rate dΔδexp of the expected yaw rate difference Δδexp is equal to or greater than the predetermined threshold dΔδth.

When the increase rate dΔδexp of the expected yaw rate difference Δδexp is equal to or greater than the predetermined threshold dΔδth, the CPU determines "Yes" at the step 1762 and then, sequentially executes the processes of the steps 1465 and 1470.

On the other hand, when the increase rate dΔδexp of the expected yaw rate difference Δδexp is smaller than the predetermined threshold dΔδth, the CPU determines "No" at the step 1762 and then, executes the process of the step 1775.

Figure 18:
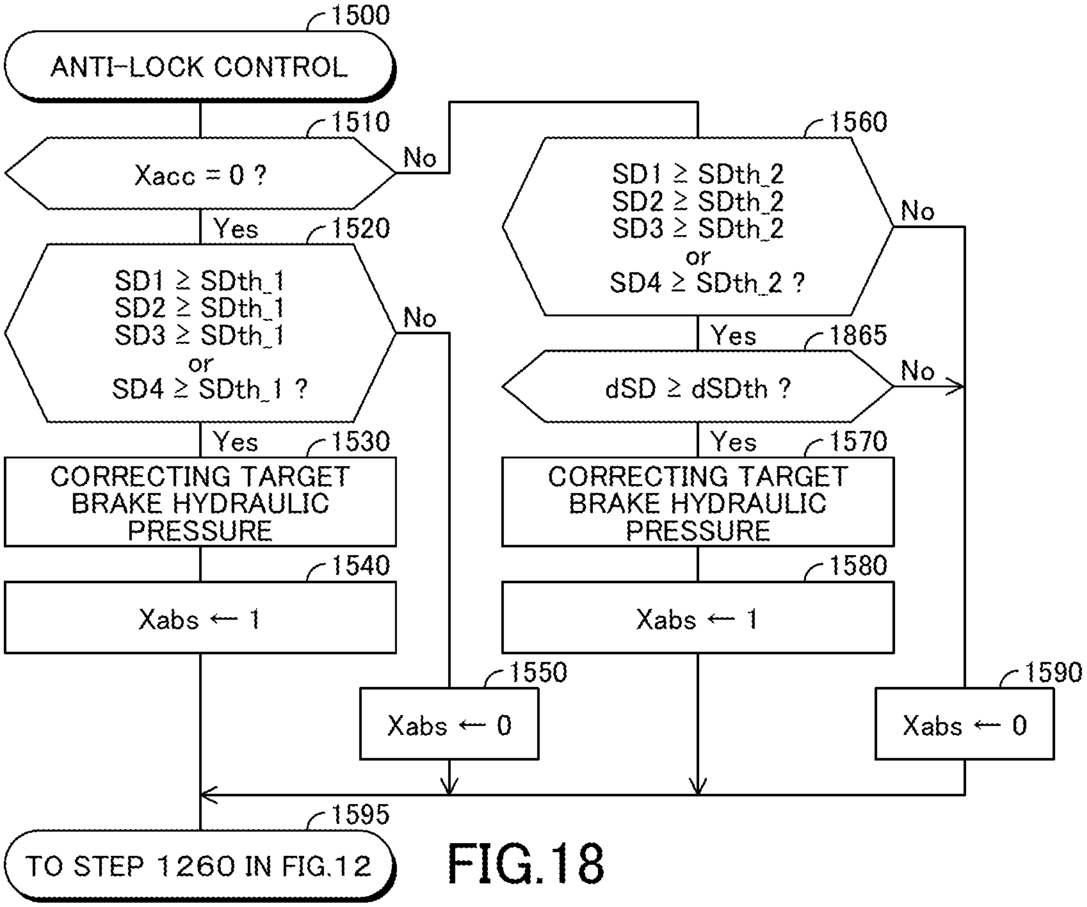
FIG. 18 is a view for showing a flowchart of a routine executed by the CPU.

Further, the routine shown in FIG. 18 is the same as the routine shown in FIG. 15 except for a step 1865. Therefore, when the CPU determines "Yes" at the step 1560, the CPU proceeds with the process to the step 1865 to determine whether the increase rate dSD of the deceleration slip rate SD becoming equal to or greater than the second threshold SDth_2 is equal to or greater than the predetermined threshold dSDth.

When the increase rate dSD of the deceleration slip rate SD becoming equal to or greater than the second threshold SDth_2 is equal to or greater than the predetermined threshold dSDth, the CPU determines "Yes" at the step 1865 and then, sequentially executes the processes of the steps 1570 and 1580.

On the other hand, when the increase rate dSD of the deceleration slip rate SD becoming equal to or greater than the second threshold SDth_2 is smaller than the predetermined threshold dSDth, the CPU determines "No" at the step 1865 and then, executes the process of the step 1590.

Figure 19:
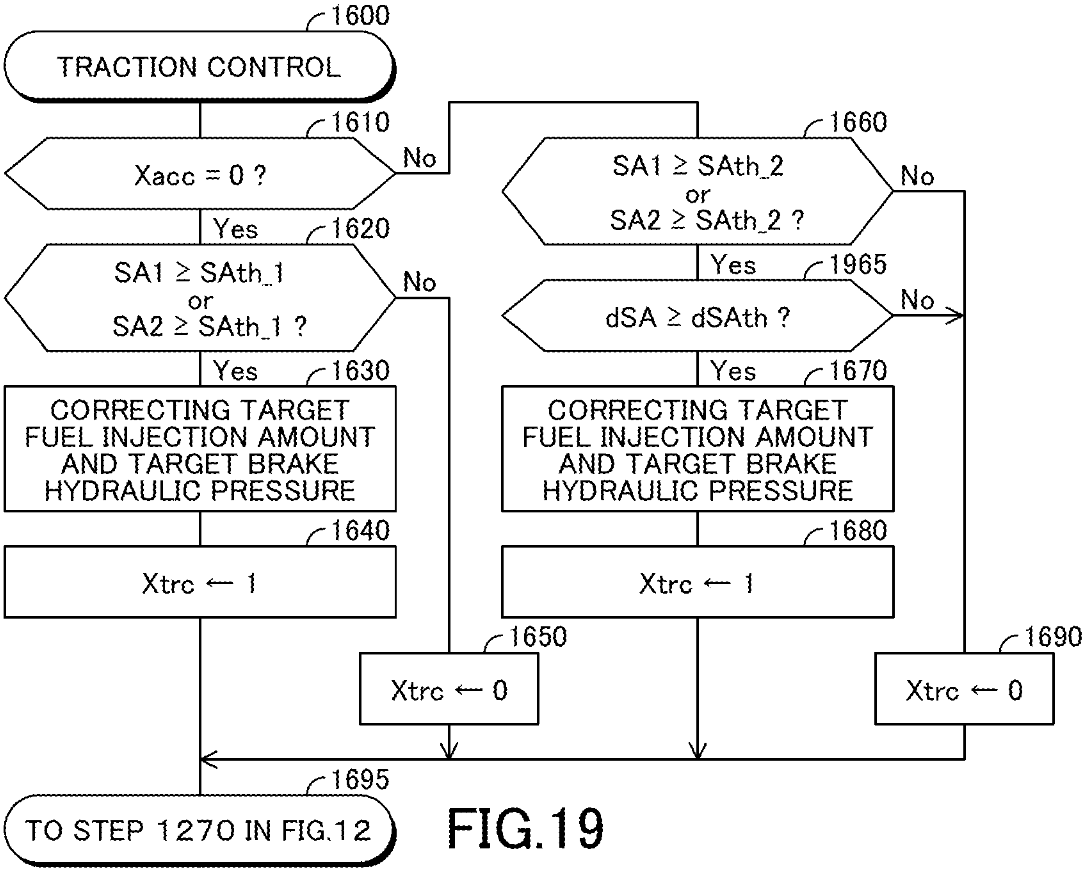
FIG. 19 is a view for showing a flowchart of a routine executed by the CPU.

Further, the routine shown in FIG. 19 is the same as the routine shown in FIG. 16 except for a step 1965. Therefore, when the CPU determines "Yes" at the step 1660, the CPU proceeds with the process to the step 1965 to determine whether the increase rate dSA of the acceleration slip rate SA becoming equal to or greater than the second threshold SAth_2 is equal to or greater than the predetermined threshold dSAth.

When the increase rate dSA of the acceleration slip rate SA becoming equal to or greater than the second threshold SAth_2 is equal to or greater than the predetermined threshold dSAth, the CPU determines "Yes" at the step 1965 and then, sequentially executes the processes of the steps 1670 and 1680.

On the other hand, when the increase rate dSA of the acceleration, slip rate SA becoming equal to or greater than the second threshold SAth_2 is smaller than the predetermined threshold dSAth, the CPU determines "No" at the step 1965 and then, executes the process of the step 1690.

The concrete operation of the modified control apparatus has been described. According to the modified control apparatus, the average value of the deceleration slip rates SD of the target vehicle wheel 50 is likely to be controlled to the value near the deceleration peak slip rate SDpeak when the execution of the anti-lock control is started while the 100 is braked by the inter-vehicle distance control (see determination processes of the steps 1560 and 1865 in FIG. 18).

Further, the average value of the acceleration slip rates SA of the target vehicle wheels is likely to be controlled to the value near the acceleration peak slip rate SApeak when the execution of the traction control is started while the vehicle 100 is braked by the inter-vehicle distance control (see determination processes of the steps 1660 and 1965 in FIG. 19).

Furthermore, the average value of the lateral slip rates SL of the vehicle wheel 50 having the lateral slip rate SL once becoming large is likely to be controlled to the value near the lateral peak slip rate SLpeak when the execution of the vehicle behavior control is started while the vehicle 100 is turned by the lane keep control (see determination processes of the steps 1445, 1747, 1460, and 1762 in FIG. 17).

The embodiment control apparatus determines whether or not to execute the anti-lock control, based on a result of a process to compare the deceleration slip rate SD with the second threshold SDth_2 smaller than the first threshold SDth_1 during the execution of the inter-vehicle distance control. In this regard, this process to compare the deceleration slip rate SD with the second threshold SDth_2 includes a process to compare the deceleration slip rate SD corrected to be increased by a predetermined value or a predetermined ratio with the first threshold SDth_1.

Similarly, the embodiment control apparatus determines whether or not to execute the traction control, based on a result of a process to compare the acceleration slip rate SA with the second threshold SAth_2 smaller than the first threshold SAth_1 during the execution of the inter-vehicle distance control. In this regard, this process to compare the acceleration slip rate SA with the second threshold SAth_2 includes a process to compare the acceleration slip rate SA corrected to be increased by a predetermined value or a predetermined ratio with the first threshold SAth_1.

Similarly, the embodiment control apparatus determines whether or not to execute the vehicle behavior control, based on a result of a process to compare the slip angle θslip with the second threshold θth_2 smaller than the first threshold θth_1 during the execution of the lane keep control. In this regard, this process to compare the slip angle θslip SA with the second threshold θth_2 smaller than the first threshold θth_1 includes a process to compare the slip angle θslip SA corrected to be increased by a predetermined value or a predetermined ratio with the first threshold θth_1.

Similarly, the embodiment control apparatus determines whether or not to execute the vehicle behavior control, based on a result of a process to compare the slip angle rate ωslip with the second threshold ωth_2 smaller than the first threshold ωth_1 during the execution of the lane keep control. In this regard, this process to compare the slip angle rate ωslip with the second threshold ωth_2 includes a process to compare the slip angle rate ωslip corrected to be increased by a predetermined value or a predetermined ratio with the first threshold ωth_1.

Similarly, the embodiment control apparatus determines whether or not to execute the vehicle behavior control, based on a result of a process to compare the expected yaw rate difference Δδexp with the second threshold Δδth_2 smaller than the first threshold Δδth_1 during the execution of the lane keep control. In this regard, this process to compare the expected yaw rate difference Δδexp with the second threshold Δδth_2 includes a process to compare the expected yaw rate difference Δδexp corrected to be increased by a predetermined value or a predetermined ratio with the first threshold Δδth_1.

Further, the inter-vehicle distance control executed by the embodiment control apparatus is an acceleration-and-deceleration assist control to cause the vehicle 100 to move by automatically accelerating or decelerating the vehicle 100, depending on the target acceleration Gtgt which is not set, based on the driver's operations to the acceleration pedal 41 and the brake pedal 42, i.e., the driver's acceleration-and-deceleration operation. In this regard, the embodiment control apparatus may be configured to execute a constant vehicle movement speed control to control the acceleration and deceleration of the vehicle 100 to control the vehicle movement speed SPD to a predetermined vehicle movement speed SPDset set by the driver as the acceleration-and-deceleration assist control.

Further, the lane keep control executed by the embodiment control apparatus is a steering assist control to cause the vehicle 100 to move by automatically steering the vehicle 100, depending on the target steering amount which is not set, based on the driver's operations to the steering wheel 43. In this regard, the embodiment control apparatus may be configured to execute a preceding vehicle following control to control the acceleration, the deceleration, and the steering of the vehicle 100 to cause the vehicle 100 to move with following a preceding vehicle 200 which moves ahead of the vehicle 100 as the steering assist control and the acceleration-and-deceleration assist control.

What is claimed is:

1. A vehicle braking force control apparatus, comprising:
a brake apparatus for applying braking force to wheels of a vehicle; and
an electronic control unit configured to:
execute a normal acceleration-and-deceleration control to (i) accelerate the vehicle at a requested acceleration set, based on an acceleration request operation performed by a driver of the vehicle and (ii) decelerate the vehicle at a requested deceleration set, based on a deceleration request operation performed by the driver;
execute a normal steering control to steer the vehicle by a requested steering amount set, based on a steering request operation performed by the driver;
execute a driving assist control including at least one of (i) an acceleration-and-deceleration assist control to automatically accelerate the vehicle at a target acceleration which the electronic control unit sets, independently of the acceleration request operation and automatically decelerate the vehicle at a target deceleration which the electronic control unit sets, independently of the deceleration request operation and (ii) a steering assist control to automatically steer the vehicle by a target steering amount which the electronic control unit sets, independently of the steering request operation;
execute a slip rate reduction control to reduce a slip rate of a wheel of the vehicle once becoming equal to or greater than a predetermined slip rate threshold by automatically changing the braking force applied from the brake apparatus to one or more of the wheels of the vehicle,
wherein the electronic control unit is configured to:
use a first slip rate threshold as the predetermined slip rate threshold when the electronic control unit executes the normal acceleration-and-deceleration control and the normal steering control; and
use a second slip rate threshold smaller than the first slip rate threshold when the electronic control unit executes the driving assist control, the second slip rate being set to a value near and smaller than a peak slip rate corresponding to the slip rate, at which a friction coefficient between the wheel of the vehicle and a surface of a road on which the vehicle moves is maximum.

2. The vehicle braking force control apparatus as set forth in, claim 1, wherein the electronic control unit is further configured to execute the slip rate reduction control when (i) the electronic control unit executes the driving assist control, (ii) the slip rate of the wheel of the vehicle becomes equal to or greater than the second slip rate threshold, and (iii) an increase rate of the slip rate becoming equal to or greater than the second slip rate threshold is equal to or greater than a predetermined increase rate threshold.

3. The vehicle braking force control apparatus as set forth in claim 1, wherein the first slip rate threshold is greater than the peak slip rate.

4. The vehicle braking force control apparatus as set forth in claim 1,
wherein the acceleration-and-deceleration assist control is any of:
(i) an inter-vehicle distance control to control a distance between the vehicle as an own vehicle and another vehicle moving ahead of the own vehicle to a predetermined distance by automatically accelerating or decelerating the own vehicle; and
(ii) a constant vehicle movement speed control to control a movement speed of the own vehicle to a predetermined movement speed by automatically accelerating or decelerating the own vehicle, and
wherein the slip rate reduction control is any of:
(i) an anti-lock control to reduce the slip rate becoming equal to or greater than the predetermined slip rate threshold by automatically decreasing the braking force applied to the wheel of the own vehicle having the slip rate becoming equal to or greater than the predetermined slip rate threshold during an execution of a process to apply the braking force to the wheels of the own vehicle from the brake apparatus; and
(ii) a traction control to reduce the slip rate becoming equal to or greater than the predetermined slip rate threshold by automatically increasing the braking force applied to the wheel of the own vehicle having the slip rate becoming equal to or greater than the predetermined slip rate threshold during an execution of a process to accelerate the own vehicle.

5. The vehicle braking force control apparatus as set forth in claim 4, wherein the traction control is a control to reduce the slip rate becoming equal to or greater than the predetermined slip rate threshold by automatically decreasing a driving force applied to the own vehicle for driving the own vehicle in addition to automatically increasing the braking force applied to the wheel of the own vehicle having the slip rate becoming equal to or greater than the predetermined slip rate threshold.

6. The vehicle braking force control apparatus as set forth in claim 1,
wherein the steering assist control is a lane keep control to cause the vehicle to move along a target movement line by automatically steering the vehicle, and
wherein the slip rate reduction control is a vehicle behavior control to reduce the slip rate becoming equal to or greater than the predetermined slip rate threshold by automatically increasing the braking force applied to at least one of the wheels of the vehicle during an execution of a process to steer the vehicle.

7. The vehicle braking force control apparatus as set forth in claim 6, wherein the vehicle behavior control is a control to reduce the slip rate becoming equal to or greater than the predetermined slip rate threshold by automatically decreasing a driving force applied to the vehicle for driving the vehicle in addition to automatically increasing the braking force applied to at least one of the wheels of the vehicle.

8. The vehicle braking force control apparatus as set forth in claim 1, wherein the driving assist control includes a preceding vehicle following control to cause the vehicle as an own vehicle to move to follow another vehicle moving ahead of the own vehicle by automatically accelerating or decelerating the own vehicle and automatically steering the own vehicle as the acceleration-and-deceleration assist control and the steering assist control, and wherein the slip rate reduction control is any of:

(i) an anti-lock control to reduce the slip rate becoming equal to or greater than the predetermined slip rate threshold by automatically decreasing the braking force applied to the wheel of the own vehicle having the slip rate becoming equal to or greater than the predetermined slip rate threshold during an execution of a process to apply the braking force to the wheels of the own vehicle from the brake apparatus;

(ii) a traction control to reduce the slip rate becoming equal to or greater than the predetermined slip rate threshold by automatically increasing the braking force applied to the wheel of the own vehicle having the slip rate becoming equal to or greater than the predetermined slip rate threshold during an execution of a process to accelerate the own vehicle; and (iii) a vehicle behavior control to reduce the slip rate becoming equal to or greater than the predetermined slip rate threshold by automatically increasing the braking force, applied to at least one of the wheels of the own vehicle during an execution of a process to steer the own vehicle.

9. The vehicle braking force control apparatus as set forth in claim 8, wherein the traction control is a control to reduce the slip rate becoming equal to or greater than the predetermined slip rate threshold by automatically decreasing a driving force applied to the own vehicle for driving the own vehicle in addition to automatically increasing the braking force applied to the wheel of the own vehicle having the slip rate becoming equal to or greater than the predetermined slip rate threshold, and wherein the vehicle behavior control is a control to reduce the slip rate becoming equal to or greater than the predetermined slip rate threshold by automatically decreasing the driving force applied to the own vehicle for driving the own vehicle in addition to automatically increasing the braking force applied to at least one of the wheels of the own vehicle.

* * * * *